(12) United States Patent
Suefuku

(10) Patent No.: US 11,679,873 B2
(45) Date of Patent: Jun. 20, 2023

(54) AIRCRAFT AND AIRCRAFT SYSTEM USING SAME

(71) Applicant: Hisayoshi Suefuku, Tokyo (JP)

(72) Inventor: Hisayoshi Suefuku, Tokyo (JP)

( * ) Notice: Subject to any disclaimer, the term of this patent is extended or adjusted under 35 U.S.C. 154(b) by 630 days.

(21) Appl. No.: 16/628,326

(22) PCT Filed: Jul. 6, 2018

(86) PCT No.: PCT/JP2018/025787
§ 371 (c)(1),
(2) Date: Mar. 19, 2020

(87) PCT Pub. No.: WO2019/009424
PCT Pub. Date: Jan. 10, 2019

(65) Prior Publication Data
US 2020/0216173 A1 Jul. 9, 2020

(30) Foreign Application Priority Data
Jul. 6, 2017 (JP) .............................. JP2017-132469

(51) Int. Cl.
*B64C 39/02* (2023.01)
*A47L 11/38* (2006.01)
(Continued)

(52) U.S. Cl.
CPC ............ *B64C 39/024* (2013.01); *A47L 11/38* (2013.01); *A62C 29/00* (2013.01); *B08B 1/04* (2013.01);
(Continued)

(58) Field of Classification Search
None
See application file for complete search history.

(56) References Cited

U.S. PATENT DOCUMENTS 3,381,922 A * 5/1968 Laing ....................... B64D 1/16
244/17.17
11,235,890 B1 * 2/2022 Dahlstrom .......... B05C 11/1005
(Continued)

FOREIGN PATENT DOCUMENTS

EP 3 521 163 A1 8/2019
JP 2016-88121 A 5/2016
(Continued)

OTHER PUBLICATIONS https://www.quora.com/What-is-the-function-of-the-tail-rotor-on-a-helicopter/answer/Greg-London-1/log Published on the site Quora by Greg London on Sep. 15, 2016 (following the question posed "What is the function of the tail rotor on a helicopter?") (Year: 2015).*

(Continued)

*Primary Examiner* — Thomas E Worden
(74) *Attorney, Agent, or Firm* — Crowell & Moring LLP

(57) ABSTRACT

An aircraft that can fly stably when water is discharged from a hose installed on the airframe, and an aircraft system, are provided. The aircraft system can include a master aircraft, slave aircrafts and a remote control device. The aircraft preferably fly as a unit. Each slave aircraft can include four rotary blade portions having propellers, and a suspending means for suspending a part of a hose. The master aircraft may include four first rotary blade portions having first propellers arranged to rotate in a horizontal plane, four second rotary blade portions having second propellers arranged to rotate in a vertical plane, and a nozzle on which a tip end part of the hose is installed. The direction of the center axis of the nozzle is parallel to the direction of the rotational axes of the second propellers.

3 Claims, 20 Drawing Sheets

(51) Int. Cl.
- *A62C 29/00* (2006.01)
- *B08B 1/04* (2006.01)
- *B64D 1/18* (2006.01)
- *A62C 31/00* (2006.01)
- *G05D 1/00* (2006.01)
- *B64U 50/00* (2023.01)
- *B64U 101/00* (2023.01)
- *B64U 101/60* (2023.01)

(52) U.S. Cl.
CPC ............... *B64D 1/18* (2013.01); *A62C 31/00* (2013.01); *B64U 50/00* (2023.01); *B64U 2101/00* (2023.01); *B64U 2101/60* (2023.01); *B64U 2201/20* (2023.01); *G05D 1/0094* (2013.01)

(56) References Cited

U.S. PATENT DOCUMENTS

| | | | |
|---|---|---|---|
| 2013/0199806 A1* | 8/2013 | Zimmerman | A62C 31/24 169/53 |
| 2015/0274294 A1 | 10/2015 | Dahlstrom | |
| 2016/0082460 A1* | 3/2016 | McMaster | B05B 13/005 239/722 |
| 2016/0122018 A1 | 5/2016 | Matsue et al. | |
| 2017/0043872 A1* | 2/2017 | Whitaker | B64C 39/024 |
| 2017/0113787 A1* | 4/2017 | Hein | A62C 31/03 |
| 2018/0141647 A1 | 5/2018 | Suzuki | |
| 2018/0244391 A1* | 8/2018 | Curran | B64D 1/22 |
| 2021/0261250 A1* | 8/2021 | Cioanta | B64D 45/00 |
| 2022/0152437 A1* | 5/2022 | Cannas | A62C 31/005 |

FOREIGN PATENT DOCUMENTS

| | | |
|---|---|---|
| JP | 2016-135660 A | 7/2016 |
| JP | 2016-209801 A | 12/2016 |
| JP | 2017-24488 A | 2/2017 |
| JP | 6086519 B1 | 3/2017 |
| JP | 2017-104063 A | 6/2017 |
| WO | WO 2015/150529 A1 | 10/2015 |
| WO | WO 2016/185572 A1 | 11/2016 |

OTHER PUBLICATIONS

Japanese-language Office Action issued in Japanese Application No. 2019-527994 dated Jan. 23, 2020 with English translation (eight (8) pages).

Japanese-language Decision to Grant a Patent issued in Japanese Application No. 2019-527994 dated May 25, 2020 with English translation (five (5) pages).

International Search Report (PCT/ISA/210) issued in PCT Application No. PCT/JP2018/025787 dated Sep. 25, 2018 with English translation (four (4) pages).

Japanese-language Written Opinion (PCT/ISA/237) issued in PCT Application No. PCT/JP2018/025787 dated Sep. 25, 2018 (five (5) pages).

* cited by examiner

AIRCRAFT AND AIRCRAFT SYSTEM USING SAME

TECHNICAL FIELD

The present invention relates to an aircraft such as a drone used in firefighting activities, cleaning works for large-sized buildings, aircrafts and the like, works of discharging liquids such as water as in a pesticide spraying work and the like on a farmland, and works for cleaning large-sized buildings, aircrafts and the like without discharging liquids such as water, for example, and an aircraft system using it.

BACKGROUND ART

A small-sized unmanned aircraft capable of autonomous flight, that is, a so-called drone has been used in recent years in various fields such as aerial photo-shooting, goods delivery, pesticide spraying and the like. In each field, a drone of a model according to its application is used. As a drone for delivery, for example, the one having a loading portion for loading goods is used (see Patent Literature 1, for example), and as a drone for the purpose of pesticide spraying, the one having a tank exclusively for containing pesticide is used (see Patent Literature 2, for example). Moreover, as a drone for cleaning, the one having a rotating brush is proposed (see Patent Literature 3, for example). Drones have a large potential in utilization thereof also in fields other than the above and are currently being developed by many researchers all over the world.

RELATED ART DOCUMENTS

Patent Literatures

Patent Literature 1: Japanese Patent No. 6086519
Patent Literature 2: Japanese Unexamined Patent Application Publication No. 2017-24488
Patent Literature 3: Japanese Unexamined Patent Application Publication No. 2016-209801

DISCLOSURE OF THE INVENTION

Problems to be Solved by the Invention

New fields of usage of the drone include a field of firefighting. A distal end portion of a hose is mounted on an airframe of a drone, the drone is flown to a fire site, and is made to discharge water from the hose, whereby rapid firefighting activities can be realized. Here, in order to perform the firefighting activity safely, water needs to be discharged at a position far from the fire site so as not to get close to the site. Thus, it is preferable to mount a hose to the airframe of the drone so that a center axis of the hose distal end portion is directed horizontally, so that the water reaches a far position from the drone by sending out the water from a pump to the hose. Moreover, water can be discharged diagonally upward by mounting the hose to the airframe of the drone so that the center axis of the hose distal end portion is directed diagonally upward, or water can be discharged downward by mounting the hose to the airframe of the drone so that the center axis of the hose distal end portion is directed downward.

However, there are some problems in realizing drones for full-scale firefighting activities. That is, in order to perform the full-scale firefighting activities by using a drone, a large quantity of water needs to be vigorously discharged from the hose. However, the drone on which the hose is mounted receives a reaction force of water discharge at the water discharge. The larger amount of water is vigorously discharged from the hose, the larger reaction force acts on the drone. Thus, it is difficult to keep a stable flight of the drone at the water discharge and moreover, it is difficult to maintain a desired water discharge direction at the water discharge. Furthermore, since the firefighting hose is long in general, how to transport such a long and heavy hose with a drone should be also considered.

Moreover, use of the drone in cleaning works for high-rise buildings, aircrafts and the like, for example, is expected. In this case, the cleaning works for the cleaning targets are likely to be realized by mounting an electric rotating brush on the airframe of the drone and by pressing the electric rotating brush onto a surface of the cleaning target while rotating/driving the electric rotating brush. However, by bringing the electric rotating brush into contact with the surface of the cleaning target, the drone receives a force from the surface and is separated from a work position. Thus, it is difficult to keep a stable flight of the drone in a state where the electric rotating brush is in contact with the cleaning target at the cleaning work.

The present invention was made in view of the circumstances above and has an object to provide an aircraft which can fly stably even at the water discharge from a hose mounted on an airframe and an aircraft system using that.

Moreover, the present invention was made in view of the circumstances above and has an object to provide an aircraft which can fly stably even when a cleaning target is to be cleaned by using an electric rotating brush provided on an airframe.

Means of Solving the Problems

An aircraft according to a first invention in order to achieve the aforementioned object is characterized by including an airframe, one or a plurality of first rotary blade portions having a first rotary blade arranged on the airframe so as to rotate in a plane substantially perpendicular to a center axis of the airframe and first driving means for rotating/driving the first rotary blade, a nozzle fixed to the airframe and to which a hose for sending out a liquid is attached, one or a plurality of second rotary blade portions having a second rotary blade arranged on the airframe so as to obtain a propelling force against a reaction force when the liquid is discharged to an outside from the nozzle through the hose and second driving means for rotating/driving the second rotary blade, and flight control means for controlling a flight of the airframe by controlling driving of each of the first driving means and each of the second driving means.

As described above, since one or a plurality of the second rotary blade portions in which the second rotary blade is arranged on the airframe so as to obtain the propelling force against the reaction force by liquid discharge is provided on the aircraft of the first invention in addition to one or a plurality of the first rotary blade portions, the second rotary blade portion can be used for obtaining the propelling force against the reaction force when the liquid is discharged to the outside from the nozzle through the hose and thus, the aircraft of first invention can make a stable flight even at the liquid discharge from the nozzle. Each of the second rotary blades is preferably arranged on the airframe so as to rotate in a plane on which an angle formed with a plane in which the first rotary blade rotates is an angle within a range from 45 to 90 degrees. If the angle formed by a rotating plane of the second rotary blade and a rotating plane of the first rotary blade is a predetermined angle within the range from 45 to 90 degrees, it is considered that each of the second rotary blade portions can effectively generate the propelling force against the reaction force by the liquid discharge. Moreover, each of the second rotary blades may be arranged on the airframe so as to rotate in the plane on which an angle formed with the plane in which the first rotary blade rotates is an angle within a range from 0 to 45 degrees.

Moreover, in the aircraft of the first invention, when a plurality of the second rotary blade portions is provided, it is preferable that each of the second rotary blades is arranged on the airframe so that a plane in which each of the second rotary blades rotates is substantially in parallel with each other and a direction of the center axis of the nozzle is substantially in parallel with the direction of the rotation axis of the second rotary blade. As a result, when each of the second rotary blades is rotated/driven, each of the second rotary blade portions generates the propelling force in the same direction and thus, the plurality of second rotary blade portions can generate a large propelling force as a whole. Moreover, since the direction of the center axis of the nozzle is substantially in parallel with the direction of the rotation axis of the second rotary blade, the propelling force generated by the plurality of second rotary blade portions can sufficiently counteract the reaction force by the liquid discharge even if the liquid is discharged vigorously from the nozzle. The direction of the center axis of the nozzle does not necessarily have to be matched with the direction of the rotation axis of the second rotary blade as long as the second rotary blade portion can be used for obtaining the propelling force against the reaction force when the liquid is discharged to the outside from the nozzle through the hose.

Moreover, in the aircraft of the first invention, it is preferable that the nozzle is detachably fixed to the airframe through a connection tool made of a material having rigidity or is detachably provided directly to the airframe. As a result, the propelling force generated by the second rotary blade portion can be efficiently transmitted to the nozzle.

Furthermore, the flight control means may be configured such that, when the liquid is not discharged to the outside from the nozzle through the hose, the flight of the airframe is controlled by controlling driving of each of the first driving means, not by controlling driving of each of the second driving means, and when the liquid is discharged to the outside from the nozzle through the hose, the flight of the airframe is controlled by controlling the driving of each of the first driving means and by controlling the driving of each of the second driving means. Power consumption can be kept as small as possible by operating one or a plurality of the second rotary blade portions only at the liquid discharge from the nozzle as described above.

In addition, the aircraft of the first invention may further include one or a plurality of rotating brushes for cleaning mounted on the airframe, the nozzle or a connection tool for connecting the aircraft and the nozzle so as to be located on a front side of the nozzle from which the liquid is sent out or in the vicinity thereof. As a result, when this aircraft is used for a cleaning work of a high-rise building, an aircraft and the like, for example, the liquid can be sent out from the nozzle, and the airframe can be maintained in a state where each of the rotating brushes is pressed onto a surface of a cleaning target by using the large propelling force by the second rotary blade portion and thus, efficient cleaning can be realized.

An aircraft system according to a second invention in order to achieve the aforementioned object is characterized by including a master aircraft which is the aircraft of the first invention, one or a plurality of slave aircrafts for following the master aircraft and suspending the hose, and a remote control device for transmitting a signal related to a flight to at least one of the aircrafts of the master aircraft and one or a plurality of the slave aircrafts so that the master aircraft and one or a plurality of the slave aircrafts fly as a unit.

In the aircraft system of the second invention, since the second rotary blade portion of the master aircraft can be used for obtaining the propelling force against the reaction force when the liquid is discharged to the outside from the nozzle through the hose by using the aircraft of the first invention as the master aircraft, a stable flight can be made even at the liquid discharge from the nozzle. Moreover, the aircraft system of the second invention includes the slave aircraft for following the master aircraft and suspending the hose, whereby the hose can be suspended by a plurality of the aircrafts and easily transported to a high position or a far site, even if a long hose is used.

Moreover, in the aforementioned aircraft system, the slave aircraft preferably includes an airframe, a plurality of rotary blade portions having a rotary blade arranged on the airframe so as to rotate in a plane substantially perpendicular to a center axis of the airframe and driving means for rotating/driving the rotary blade, suspending means having flexibility for suspending the hose from the airframe of the slave aircraft or a connecting member having rigidity provided on the airframe, and flight control means for controlling a flight of the slave aircraft by controlling driving of each of the driving means. As described above, in the slave aircraft, since the one having flexibility is used as the suspending means for suspending the hose from the airframe or the connecting member, the suspending means allows swing of the hose by the reaction force at the liquid discharge to escape so that the influence is not much transmitted to the airframe and thus, the slave aircraft can make a stable flight even at the liquid discharge from the nozzle.

Moreover, in the aforementioned aircraft system, it is preferable that the flight control means of the master aircraft controls the flight of its own aircraft in accordance with a signal related to the flight transmitted from the remote control device, and the flight control means of each of the slave aircrafts obtains altitude information and position information of the master aircraft from the master aircraft by using any one or a combination of at least two of arts, that is, wireless communication, wired communication, image recognition, and acoustic communication and controls the altitude and position of its own aircraft on the basis of the obtained altitude information and position information. As a result, each of the slave aircrafts can make an autonomous flight so that a certain distance is maintained with respect to the master aircraft on the basis of the altitude information and the position information of the master aircraft and thus, control of the flight as a unit of the master aircraft and the slave aircraft is made easy.

Moreover, power can be supplied to each of the master aircraft and one or a plurality of slave aircrafts by wired power supply using a power supply line provided along the hose, wireless power supply, or by a battery mounted on the aircraft or an engine using a fossil fuel.

An aircraft according to a third invention in order to achieve the aforementioned object is characterized by including an airframe, one or a plurality of first rotary blade portions having a first rotary blade arranged on the airframe so as to rotate in a plane substantially perpendicular to a center axis of the airframe and first driving means for rotating/driving the first rotary blade, one or a plurality of electric rotating brushes for cleaning attached to the airframe, one or a plurality of second rotary blade portions having a second rotary blade arranged on the airframe so as to obtain a propelling force against a force received from a surface of a cleaning target when each of the electric rotating brushes is brought into contact with the cleaning target and second driving means for rotating/driving the second rotary blade, and flight control means for controlling a flight of the airframe by controlling driving of each of the first driving means and each of the second driving means and for controlling rotation/driving of each of the electric rotating brushes. More specifically, it is preferable that when the cleaning target is to be cleaned by using each of the electric rotating brushes, the flight control means controls the flight of the airframe so that the airframe moves or hovers in the vicinity of the cleaning target by controlling the driving of each of the first driving means and controls the flight of the airframe so that the airframe moves to a direction in which each of the electric rotating brushes is pressed onto the surface of the cleaning target by controlling the driving of each of the second driving means.

As described above, since one or a plurality of the second rotary blade portions in which the second rotary blade is arranged on the airframe so as to obtain the propelling force against the force received from the surface of the cleaning target when each of the electric rotating brushes is brought into contact with the surface of the cleaning target is provided in the aircraft of the third invention in addition to one or a plurality of the first rotary blade portions, the airframe can be maintained in the state where each of the electric rotating brushes is reliably pressed onto the surface of the cleaning target by using the propelling force generated by the second rotary blade portion and thus, the cleaning target can be efficiently cleaned by using the aircraft of the third invention.

Moreover, in the aircraft of the third invention, when a plurality of the second rotary blade portions is provided, it is preferable that each of the second rotary blades is arranged on the airframe so that a plane in which each of the second rotary blade rotates is substantially in parallel with each other, and an angle formed by a rotation axis of each of the electric rotating brushes and a rotation axis of the second rotary blade is an angle within a range from 0 to 45 degrees. Since each of the second rotary blades is arranged on the airframe so that the plane in which each of the second rotary blades rotates is substantially in parallel with each other, when each of the second rotary blades is rotated/driven, each of the second rotary blade portions generates the propelling force in the same direction and thus, the plurality of second rotary blade portions can generate a large propelling force as a whole. Moreover, since the angle formed by the rotation axis of each of the electric rotating brushes and the rotation axis of the second rotary blade is an angle within the range from 0 to 45 degrees, the plurality of second rotary blade portions can effectively generate the propelling force to counteract the force from the surface of the cleaning target.

An aircraft according to a fourth invention in order to achieve the aforementioned object is characterized by including an airframe, one or a plurality of first rotary blade portions having a first rotary blade arranged on the airframe for flying the airframe and first driving means for rotating/driving the first rotary blade, a mounting equipment mounted on the airframe and applying a reaction force to the airframe during use, one or a plurality of second rotary blade portions having a second rotary blade arranged on the airframe so as to obtain a propelling force against the reaction force generated by using the mounting equipment and second driving means for rotating/driving the second rotary blade, and flight control means for controlling a flight of the airframe by controlling driving of each of the first driving means and each of the second driving means.

As described above, since one or a plurality of the second rotary blade portions in which the second rotary blade is arranged on the airframe so as to obtain the propelling force against the reaction force generated by using the mounting equipment is provided in the aircraft of the fourth invention in addition to one or a plurality of the first rotary blade portions, the second rotary blade portion can be used for obtaining the propelling force against the reaction force generated by using the mounting equipment and thus, the aircraft of the fourth invention can make a stable flight even in use of the mounting equipment. In general, if an action direction of the propelling force by the second rotary blade is substantially in parallel with an action direction of the reaction force generated by using the mounting equipment, the influence of the reaction force on the airframe can be effectively suppressed. However, the action direction of the propelling force by the second rotary blade and the action direction of the reaction force generated by using the mounting equipment do not necessarily have to be in parallel. Moreover, a rotation axis of the first rotary blade and a rotation axis of the second rotary blade do not necessarily have to be perpendicular, and the rotation axis of the first rotary blade and the rotation axis of the second rotary blade may be in parallel, for example.

Moreover, the aircraft of the fourth invention preferably includes a mechanism for adjusting a rotation axis direction of the second rotary blade with respect to a rotation axis direction of the first rotary blade and a mechanism for adjusting an acting direction of the reaction force generated by using the mounting equipment with respect to the rotation axis direction of the first rotary blade. As a result, the reaction force generated by using the mounting equipment can be made to act in any direction, and in whatever direction the reaction force is made to act, the influence of the reaction force on the airframe can be effectively suppressed by adjusting the rotation axis direction of the second rotary blade in accordance with that.

Moreover, an aircraft according to a fifth invention is characterized by including an airframe, one or a plurality of first rotary blade portions having a first rotary blade arranged on the airframe for flying the airframe and first driving means for rotating/driving the first rotary blade, one or a plurality of second rotary blade portions having a second rotary blade arranged on the airframe for obtaining a force counteracting an external force which makes an attitude of the airframe unstable and second driving means for rotating/driving the second rotary blade, an angle adjustment mechanism for adjusting a rotation axis direction of each of the second rotary blades, and flight control means for controlling a flight of the airframe by controlling driving of each of the first driving means during a flight, and for realizing a stable flight by controlling the angle adjustment mechanism when an attitude of the airframe is changed upon receipt of the external force during the flight so as to adjust the rotation axis direction of each of the second rotary blades, and by controlling the driving of each of the second driving means so as to reduce an influence of the external force on the airframe.

In this aircraft according to the fifth invention, since the flight control means adjusts the rotation axis direction of each of the second rotary blades by controlling the angle adjustment mechanism when the attitude of the airframe is changed upon receipt of the external force during the flight, and the influence of the external force on the airframe is reduced by controlling the driving of each of the second driving means, even when the attitude of the airframe is largely lost by disturbance, an attitude change of the airframe is suppressed and the flight can be continued, a fall can be prevented, a falling speed can be reduced, or the flight is temporarily maintained and can be recovered to a normal flight by the first rotary blade.

Effects of the Invention

In the aircraft according to the first invention, since one or a plurality of the second rotary blade portions in which the second rotary blade is arranged on the airframe so as to obtain the propelling force against the reaction force by liquid discharge is provided in addition to one or a plurality of the first rotary blade portions, the second rotary blade portion can be used for obtaining the propelling force against the reaction force when the liquid is discharged to the outside from the nozzle through the hose and thus, the aircraft according to the present invention can make a stable flight even at the liquid discharge from the nozzle. Moreover, since the aircraft system according to the present invention includes the master aircraft which is the aforementioned aircraft and at least one slave aircraft for following the master aircraft and for suspending the hose, the master aircraft and each of the slave aircrafts can make a stable flight even at the liquid discharge from the nozzle, and even when a long hose is used, the hose can be easily transported to a high position or a far site by suspending the hose by a plurality of the aircrafts. Moreover, the aircraft system according to the second invention can also exert the effect similar to the effect of the aforementioned first invention.

Furthermore, in the aircraft according to the third invention, since one or a plurality of the second rotary blade portions in which the second rotary blade is arranged on the airframe so as to obtain the propelling force against the force received from the surface of the cleaning target when each of the electric rotating brushes is brought into contact with the surface of the cleaning target is provided in addition to one or a plurality of the first rotary blades portions, the airframe can be maintained in the state where each of the electric rotating brushes is reliably pressed onto the surface of the cleaning target by using the propelling force generated by the second rotary blade portion and thus, the cleaning of the cleaning target can be performed efficiently by using the aircraft according to the present invention.

Moreover, in the aircraft according to the fourth invention, since one or a plurality of the second rotary blade portions in which the second rotary blade is arranged on the airframe so as to obtain the propelling force against the reaction force generated by using the mounting equipment is provided in addition to one or a plurality of the first rotary blade portions, the second rotary blade portion can be used for obtaining the propelling force against the reaction force generated by using the mounting equipment and thus, the aircraft of the fourth invention can make a stable flight even in use of the mounting equipment.

Furthermore, in the aircraft according to the fifth invention, when the external force is received during a flight and the attitude of the airframe is changed, the flight control means controls the angle adjustment mechanism so as to adjust the rotation axis direction of each of the second rotary blades and controls the driving of each of the second driving means so as to reduce the influence of the external force on the airframe and thus, even when the attitude of the airframe is largely lost by disturbance, the attitude change of the airframe can be suppressed, and a stable flight of the airframe can be maintained.

MODE FOR CARRYING OUT THE INVENTION

Figure 1:
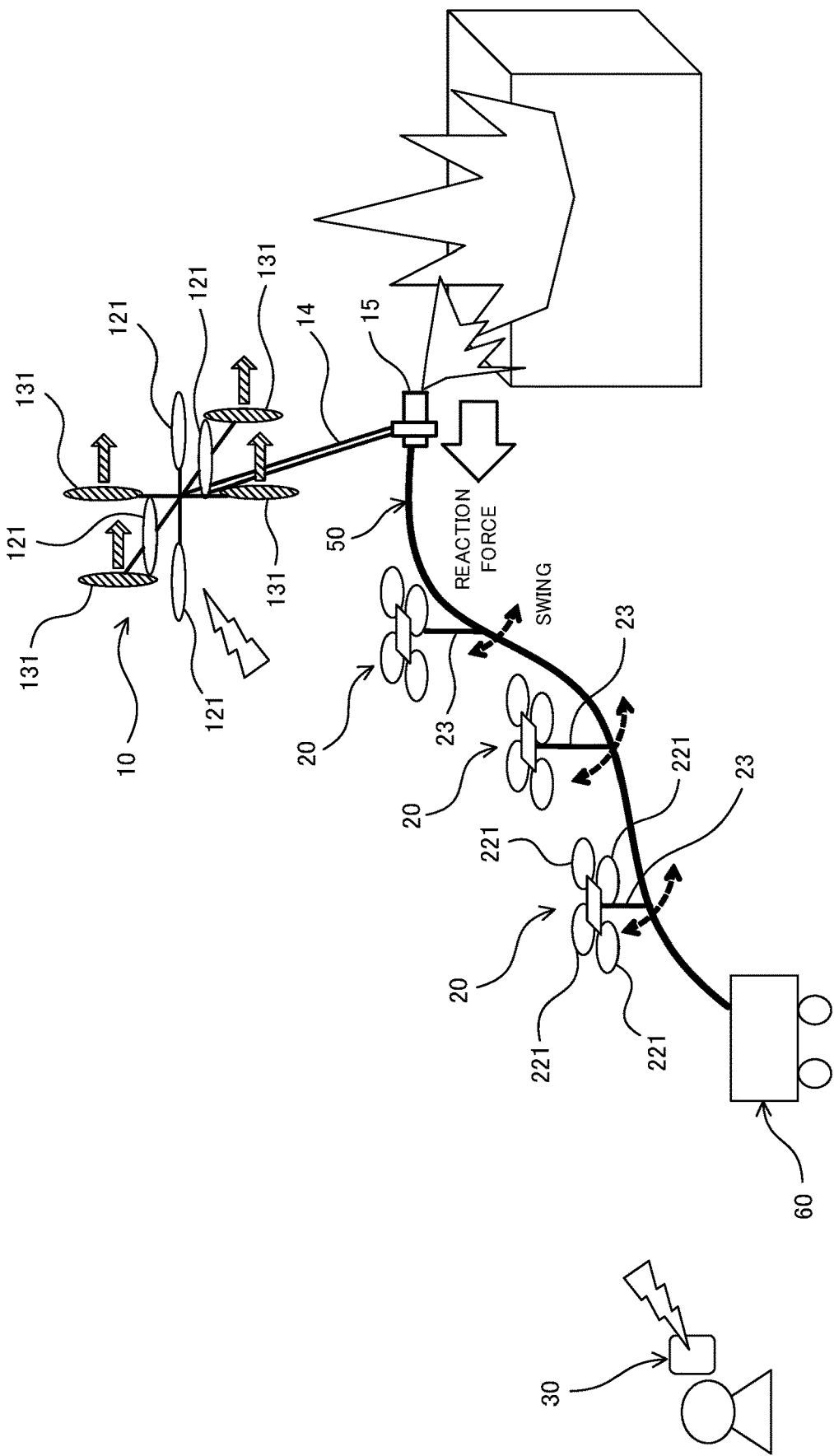
FIG. 1 is a conceptual diagram of an aircraft system which is an embodiment of the present invention.
Figure 2:
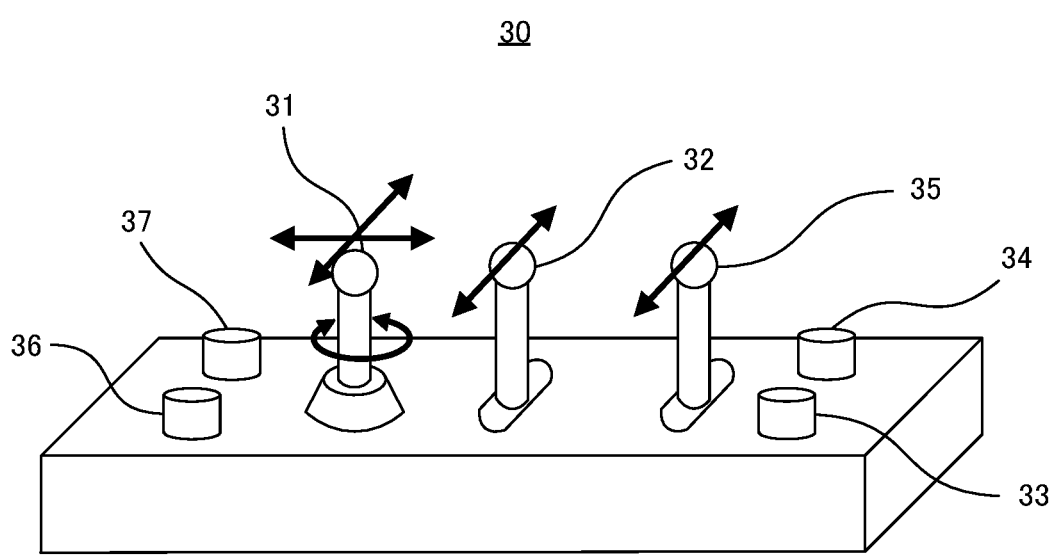
FIG. 2 is a schematic perspective view of a remote control device in the aircraft system.
Figure 3:
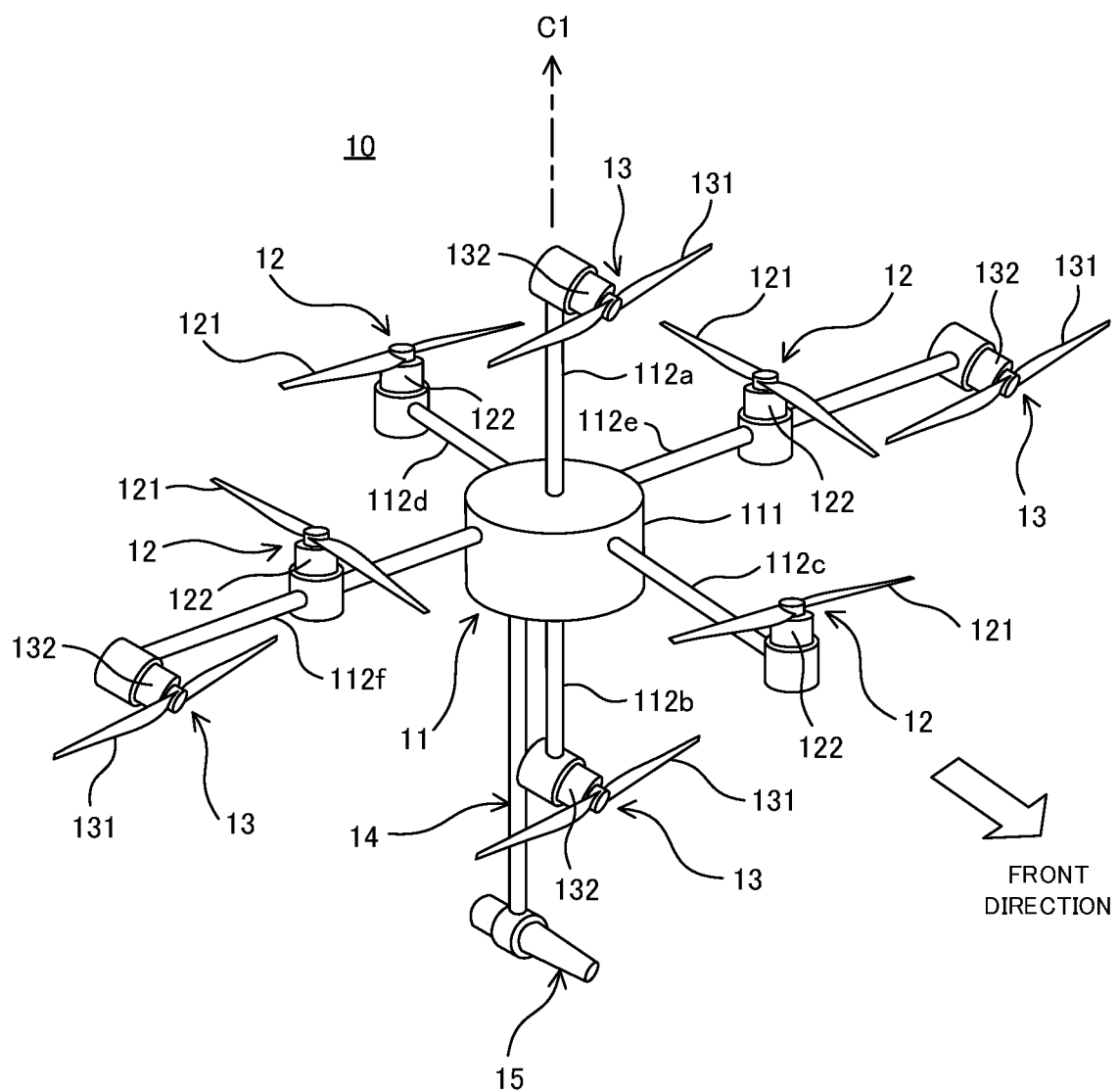
FIG. 3 is a schematic diagram of a master aircraft in the aircraft system.
Figure 4:
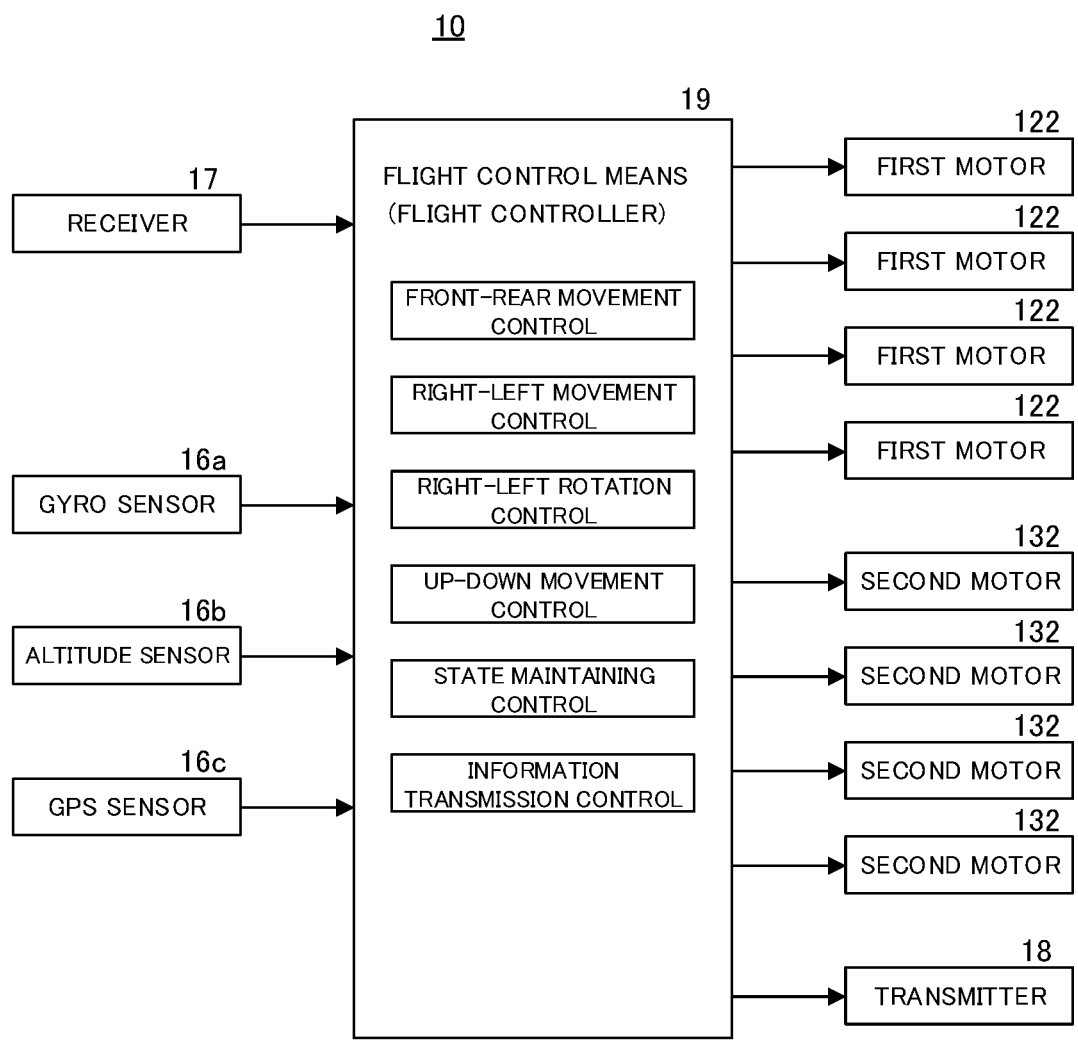
FIG. 4 is a schematic block diagram of the master aircraft.
Figure 5:
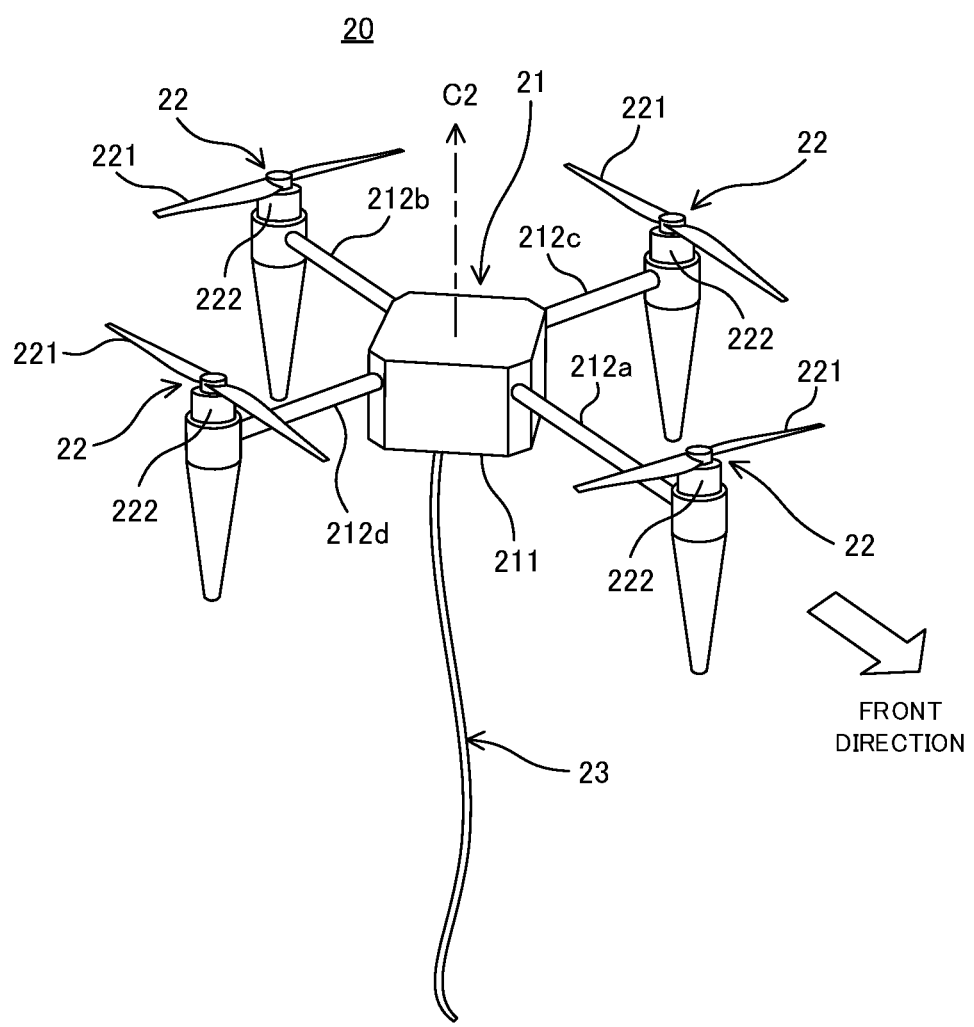
FIG. 5 is a schematic diagram of a slave aircraft in the aircraft system of this embodiment.
Figure 6:
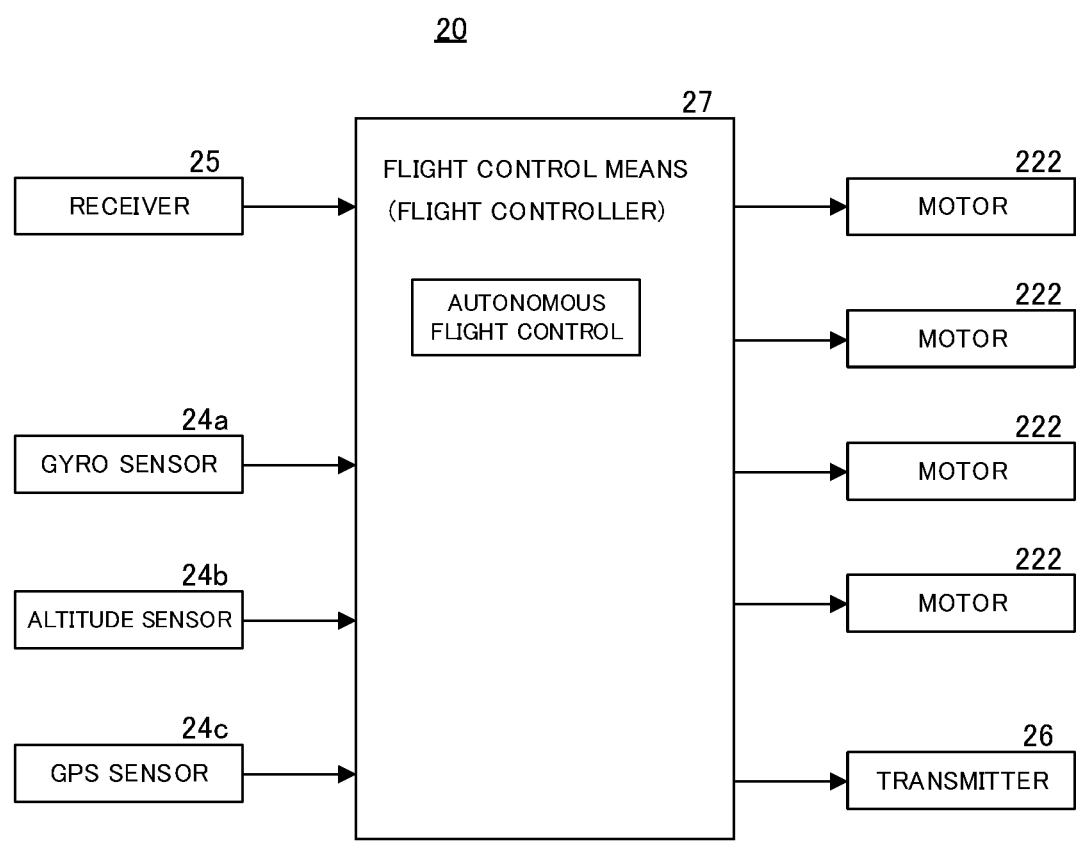
FIG. 6 is a schematic block diagram of the slave aircraft.

Hereinafter, embodiments for working an invention according to the present application will be described by referring to the drawings. FIG. 1 is a conceptual diagram of an aircraft system which is an embodiment of the present invention, and FIG. 2 is a schematic perspective view of a remote control device in the aircraft system. FIG. 3 is a schematic diagram of a master aircraft in the aircraft system, and FIG. 4 is a schematic block diagram of the master aircraft. FIG. 5 is a schematic diagram of a slave aircraft in the aircraft system of this embodiment, and FIG. 6 is a schematic block diagram of the slave aircraft.

The aircraft system of this embodiment is mainly used for performing a firefighting activity at a fire site. This aircraft system includes, as illustrated in FIGS. 1 to 6, one master aircraft 10, three slave aircrafts 20, 20, 20, and a remote control device 30. In this embodiment, as the master aircraft 10 and each of the slave aircrafts 20, a small-sized unmanned aircraft capable of autonomous flight, called a drone, a multicopter or the like, is used. The aircraft system according to the present invention is not limited to the description contents of this embodiment. Configuration numbers of the master aircraft and the slave aircrafts illustrated in FIG. 1, for example, are only an example.

More specifically, when the aircraft system of this embodiment is used for the firefighting activity, as illustrated in FIG. 1, one of end portions of a hose 50 for firefighting is attached to the master aircraft 10. This hose 50 is for sending out water from a water-discharge pumper vehicle 60. A length of the hose 50 is approximately 100 m, and a thickness thereof is a diameter of approximately 50 mm, for example. The other end portion of the hose 50 is attached to the water-discharge pumper vehicle 60. Each of the slave aircrafts 20 plays a role of following the master aircraft 10 and suspending the hose 50. When a person performing the firefighting activity cannot get closer to the fire site or when a fire occurs at a high floor in a building, for example, the master aircraft 10 and the slave aircrafts 20, 20, 20 transport the hose 50 in collaboration to a water discharge position close to the fire site. The aircraft system of this embodiment has the three slave aircrafts 20, 20, 20 in addition to the master aircraft 10 at the head position and thus, they can transport the hose 50 close to the fire site efficiently and rapidly.

The water-discharge pumper vehicle 60 pumps up water with a pump from a tank or the like and sends it out to the hose 50. A microcomputer (not shown) is mounted on this water-discharge pumper vehicle 60, and this microcomputer can automatically control driving of the pump upon receipt of a signal related to the water discharge from the remote control device 30. Here, the signal related to the water discharge includes an instruction signal that the water discharge should be started, an instruction signal that the water discharge should be stopped, and an instruction signal related to a water discharge amount. More specifically, when the instruction signal that the water discharge should be started is received from the remote control device 30, the microcomputer causes the pump to be operated so as to start the water discharge. Moreover, when the instruction signal related to the water discharge amount is received from the remote control device 30, the microcomputer controls the driving of the pump so that the water discharge is performed in the water discharge amount. Furthermore, when the instruction signal that the water discharge should be stopped is received from the remote control device 30, the microcomputer stops the operation of the pump.

The remote control device 30 is a remote-control type device for an operator to manually operate the aircraft system of this embodiment. From this remote control device 30, a signal related to a flight is generally transmitted to at least one aircraft of the master aircraft 10 and the slave aircrafts 20, 20, 20 so that the one master aircraft 10 and the three slave aircrafts 20, 20, 20 make a flight as a unit. In this embodiment, only the master aircraft 10 is assumed to receive the signal related to the flight from the remote control device 30. Each of the slave aircrafts 20 does not receive the signal related to the flight from the remote control device 30 but receives position information and altitude information of the master aircraft 10 transmitted from the master aircraft 10 and controls the position and the altitude of its own aircraft on the basis of the position information and the altitude information of the master aircraft 10. Moreover, the remote control device 30 transmits the signal related to the water discharge to the water-discharge pumper vehicle 60 as described above and is used for allowing the water-discharge pumper vehicle 60 to perform the water discharge work.

More specifically, the remote control device 30 has, as illustrated in FIG. 2, a front-rear-right-left lever 31, an up-down lever 32, a water-discharge start switch 33, a water-discharge stop switch 34, a water-discharge amount lever 35, a state maintaining start switch 36, a state maintaining cancellation switch 37, a transmission portion (not shown), and a control portion (not shown). The front-rear-right-left lever 31 is for instructing front/rear movement, right/left movement or the like to the master aircraft 10. When the operator tilts the front-rear-right-left lever 31 to the front, the control portion generates an instruction signal that the airframe should be moved to the front and transmits it through the transmission portion. By tilting the front-rear-right-left lever 31 to the rear, the control portion generates an instruction signal that the airframe should be moved to the rear and transmits it through the transmission portion. By tilting the front-rear-right-left lever 31 to the left, the control portion generates an instruction signal that the airframe should be moved to the left direction and transmits it through the transmission portion. And by tilting the front-rear-right-left lever 31 to the right, the control portion generates an instruction signal that the airframe should be moved to the right direction and transmits it through the transmission portion. Moreover, when the operator rotates the front-rear-right-left lever 31 counterclockwise, the control portion generates an instruction signal that the airframe should be rotated to the left on a horizontal plane and transmits it through the transmission portion, while by rotating the front-rear-right-left lever 31 clockwise, the control portion generates an instruction signal that the airframe should be rotated to the right on the horizontal plane and transmits it through the transmission portion. Moreover, the up-down lever 32 is for instructing elevation up/down to the master aircraft 10. When the operator tilts the up-down lever 32 to the front, the control portion generates an instruction signal that the airframe should be raised and transmits it through the transmission portion. And by tilting the up-down lever 32 to the rear, the control portion generates an instruction signal that the airframe should be lowered and transmits it through the transmission portion.

The water-discharge start switch 33 is for instructing start of the water discharge to the water-discharge pumper vehicle 60. When the operator presses down the water-discharge start switch 33, the control portion generates an instruction signal that the water discharge should be started and transmits it through the transmission portion. The water-discharge stop switch 34 is for instructing stop of the water discharge to the water-discharge pumper vehicle 60. When the operator presses down the water-discharge stop switch 34, the control portion generates an instruction signal that the water discharge should be stopped and transmits it through the transmission portion. Moreover, the water-discharge amount lever 35 is for instructing a water discharge amount to the water-discharge pumper vehicle 60 at the water discharge. When the operator tilts the water-discharge amount lever 35 to the front, the control portion generates an instruction signal that the water discharge amount should be increased and transmits it through the transmission portion. And by tilting the water-discharge amount lever 35 to the rear, the control portion generates an instruction signal that the water discharge amount should be decreased and transmits it through the transmission portion. Moreover, the state maintaining start switch 36 is for instructing that a current attitude (direction or tilting of the airframe) should be maintained at the current altitude and position to the master aircraft 10, that is, for instructing hovering. When the operator presses down the state maintaining start switch 36, the control portion generates an instruction signal that state maintaining control for maintaining the current attitude at the current altitude and position of the airframe should be started and transmits it through the transmission portion. The state maintaining cancellation switch 37 is for instructing cancellation of the state maintaining control for maintaining the current attitude at the current altitude and position to the master aircraft 10. When the operator presses down the state maintaining cancellation switch 37, the control portion generates an instruction signal that the state maintaining control should be cancelled and transmits it through the transmission portion.

Subsequently, the master aircraft 10 will be described. The master aircraft 10 plays a role of transporting the hose 50 to the fire site in the firefighting activity at the head of the slave aircrafts 20, 20, 20. This master aircraft 10 includes, as illustrated in FIGS. 1, 3, and 4, an airframe 11, four first rotary blade portions 12, 12, 12, 12, four second rotary blade portions 13, 13, 13, 13, a connecting tool 14, a nozzle 15, a gyro sensor 16a, an altitude sensor 16b, a GPS sensor 16c, a receiver 17, a transmitter 18, and flight control means (flight controller) 19.

The airframe 11 of the master aircraft 10 has, as illustrated in FIG. 3, a fuselage portion 111 located at the center, and arm portions 112a, 112b, 112c, 112d, 112e, 112f extending in each direction of upper, lower, front, rear, right, and left from the fuselage portion 111. Here, the arm portions 112e and 112f extending in the right and left directions in FIG. 3 are longer than the other arm portions 112a, 112b, 112c, and 112d. The fuselage portion 111 accommodates the gyro sensor 16a, the altitude sensor 16b, the GPS sensor 16c, the receiver 17, the transmitter 18, and the flight control means 19. Here, the case in which the arm portions 112e and 112f extending in the right and left directions in FIG. 3 are longer than the other arm portions 112a, 112b, 112c, and 112d is explained, but a length of each of the arm portions 112a, . . . , 112f can be determined arbitrarily.

The first rotary blade portion 12 is disposed on each of a distal end portion of the arm portion 112c extending to the front direction, a distal end portion of the arm portion 112d extending to the rear direction, a center portion of the arm portion 112e extending to the left direction, and the center portion of the arm portion 112f extending to the right direction, respectively, in FIG. 3. Each of the first rotary blade portions 12 has a first propeller (first rotary blade) 121 and a first motor (first driving means) 122 for rotating/driving the first propeller 121 as illustrated in FIGS. 3 and 4. Here, the first propeller 121 of each of the first rotary blade portions 12 is arranged at a predetermined spot on the arm portion so as to rotate in a plane substantially perpendicular to a center axis C1 of the airframe 11. Moreover, an interval from the center of the fuselage portion 111 to each of the first propellers 121 is the same. Here, the case in which the interval from the center of the fuselage portion 111 to each of the first propellers 121 is the same is described, but the interval from the center of the fuselage portion 111 to each of the first propellers 121 does not have to be the same in general. Even if the intervals are not all the same, a stable flight can be made by flight control of the flight control means 19. However, the flight control is easier if the intervals are all the same.

Moreover, the second rotary blade portion 13 is disposed on each of a distal end portion of the arm portion 112a extending to the upper direction, a distal end portion of the arm portion 112b extending to the lower direction, a distal end portion of the arm portion 112e extending to the left direction, and a distal end portion of the arm portion 112f extending to the right direction, respectively, in FIG. 3. Each of the second rotary blade portions 13 has a second propeller (second rotary blade) 131 and a second motor (second driving means) 132 for rotating/driving the second propeller 131 as illustrated in FIGS. 3 and 4. Here, the second propeller 131 of each of the second rotary blade portions 13 is arranged at a predetermined spot on the arm portion so as to rotate in a plane substantially orthogonal to a plane in which the first propeller 121 rotates. Therefore, rotation axes of the second propellers 131 are all directed to the front direction, and the four second propellers 131, 131, 131, 131 can rotate on the same plane.

The connecting tool 14 is for detachably connecting the airframe 11 and the nozzle 15. As the connecting tool 14, a rod-shaped one made of a material having rigidity such as metal, carbon, high-hardness plastic and the like can be used, for example. One of end portions of this connecting tool 14 is fixed to the airframe 11 by a screw or the like, and the nozzle 15 is detachably fixed to the other end portion.

The nozzle 15 is for attaching the distal end portion of the hose 50 for sending out water. This nozzle 15 is detachably fixed to the airframe 11 through the connecting tool 14 as described above. More specifically, the nozzle 15 is arranged so that a direction of a center axis of the nozzle 15 is substantially in parallel with a normal direction of the plane in which the second propeller 131 rotates, that is, the rotation axis direction of each of the second propellers 131.

The gyro sensor 16a is for detecting an attitude (a direction and an inclination) of the master aircraft 10 (airframe 11). Attitude information detected by this gyro sensor 16a is sent to the flight control means 19. The altitude sensor 16*b* is for detecting an altitude of the master aircraft 10 (airframe 11). As this altitude sensor 16*b*, an air pressure sensor can be used, for example. The altitude information detected by the altitude sensor 16*b* is sent to the flight control means 19. Moreover, the GPS sensor 16*c* is for receiving radio waves from a plurality of GPS satellites and calculating two-dimensional position information of the master aircraft 10 (airframe 11) on the ground on the basis of those received radio waves. The two-dimensional position information obtained by the GPS sensor 16*c* is sent to the flight control means 19.

The receiver 17 is for receiving a signal related to the flight transmitted from the remote control device 30. More specifically, the signals related to the flight transmitted from the remote control device 30 include an instruction signal that the airframe is to be raised, an instruction signal that the airframe is to be lowered, an instruction signal that the airframe is to be moved to the forward, an instruction signal that the airframe is to be moved to the rear, an instruction signal that the airframe is to be moved to the left direction, an instruction signal that the airframe is to be moved to the right direction, an instruction signal that the airframe is to be rotated leftward, an instruction signal that the airframe is to be rotated rightward, an instruction signal that the state maintaining control for maintaining a current attitude of the airframe at current position and altitude is to be started, and an instruction signal that the state maintaining control is to be cancelled and the like. Moreover, the receiver 17 also receives a signal related to water discharge transmitted from the remote control device 30, that is, a signal that the water discharge is to be started or the water discharge is to be stopped, in addition to the signals related to the flight. On the other hand, the transmitter 18 is for transmitting the altitude information and the two-dimensional position information of its own aircraft generated by the flight control means 19 to each of the slave aircrafts 20, 20, 20. If a camera is mounted on the master aircraft 10, for example, the transmitter 18 is used for transmitting image information photographed by the camera. In this case, it may be so configured that a liquid crystal display device is provided in advance in the remote control device 30, and an image based on the image information transmitted from the master aircraft 10 is displayed.

The flight control means 19 is the one which is a so-called flight controller and controls a flight of the master aircraft 10 (airframe 11) by controlling the driving of the first motor 122 of each of the first rotary blade portions 12 and the driving of the second motor 132 of each of the second rotary blade portions 13. More specifically, the flight control means 19 determines a rotation number, a rotation direction and the like of each motor on the basis of the signal related to the flight from the remote control device 30 and the information detected by each of the sensors 16*a*, 16*b*, and 16*c*, and realizes a flight according to the contents of the signal related to the flight from the remote control device 30 by controlling the driving of each motor in accordance with the determined contents. That is, the flight control means 19 has a front-rear movement control function, a right-left movement control function, a right-left rotation control function, and up-down movement control function to the master aircraft 10. The flight control means 19 controls the attitude of the airframe 11 so that the airframe 11 is not tilted on the basis of the attitude information detected by the gyro sensor 16*a* at all times during the flight control. Moreover, in this embodiment, the case in which the flight control means 19 determines in which direction of the clockwise direction and the counterclockwise direction each motor is to be rotated is described, but it is needless to say that the rotation direction of each motor may be determined to one direction in advance similarly to an ordinary drone.

Particularly in this embodiment, when water is not discharged to the outside from the nozzle 15 through the hose 50, the flight control means 19 control the flight of the master aircraft 10 by controlling only the driving of the first motor of each of the first rotary blade portions 12, 12, 12, 12 without driving the second motor of each of the second rotary blade portions 13, 13, 13, 13, while when water is discharged to the outside from the nozzle 15 through the hose 50, the flight control means 19 control the flight of the master aircraft 10 by controlling the driving of the first motor of each of the first rotary blade portions 12, 12, 12, 12 and by controlling the driving of the second motor of each of the second rotary blade portions 13, 13, 13, 13. Here, the flight control means 19 can determined whether the water discharge from the nozzle 15 is currently being performed on the basis of the signal related to the water discharge sent from the remote control device 30. As described above, in this embodiment, the four second rotary blade portions 13, 13, 13, 13 are used only during the water discharge from the nozzle 15. Actually, when water is discharged from the nozzle 15, the nozzle 15 receives a reaction force by the water discharge, and the reaction force is transmitted to the airframe 11 through the connecting tool 14. Thus, the airframe 11 receives a large reaction force by the water discharge at the water discharge from the nozzle 15, and the position (the altitude and the two-dimensional position) of the airframe 11 in the space is changed. In this embodiment, changes in the position and the attitude of the airframe 11 in the space caused by the reaction force of the water discharge received by the airframe 11 are handled by using a propelling force by the four second rotary blade portions 13, 13, 13, 13.

Moreover, the flight control means 19 has an autonomous flight control function similarly to the ordinary drone. In this embodiment, the master aircraft 10 can execute the state maintaining control for maintaining the current attitude at the current altitude and position for the airframe 11 as the autonomous flight control. The operator instructs turning-on of the autonomous flight control function by pressing the state maintaining start switch 36 of the remote control device 30 and then, instructs turning-off of the autonomous flight control function by pressing the state maintaining cancellation switch 37 of the remote control device 30. As described above, when the operator presses the state maintaining start switch 36 of the remote control device 30, the remote control device 30 transmits an instruction signal that the state maintaining control for maintaining the current attitude of the airframe at the current altitude and position is started, while when the operator presses the state maintaining cancellation switch 37 of the remote control device 30, the remote control device 30 transmits an instruction signal that the state maintaining control is cancelled. When the flight control means 19 receives the instruction signal that the state maintaining control is started while the flight control based on a manual operation by the operator is executed, it turns on the autonomous flight control function, while when it receives the instruction signal that the state maintaining control is cancelled while the state maintaining control of the master aircraft 10 is executed, it turns off the autonomous flight control function. More specifically, when the flight control means 19 receives the instruction signal from the remote control device 30 that the state maintaining control is started while the flight control based on the manual operation by the operator is executed, the flight control means 19 stores the attitude information, the altitude information, and the two-dimensional position information detected by each of the sensors 16a, 16b, and 16c in storage means (not shown) at reception thereof and executes the state maintaining control (hovering control) of the master aircraft 10 so that the attitude, altitude, and two-dimensional position of the airframe 11 is the contents of the stored information at all times. Therefore, when the operator presses the state maintaining start switch 36 of the remote control device 30, the hovering flight is performed so that the master aircraft 10 maintains the attitude, altitude, and two-dimensional position when the state maintaining start switch 36 is pressed. On the other hand, when the flight control means 19 receives the instruction signal from the remote control device 30 that the state maintaining control is cancelled while the state maintaining control is executed, the flight control means 19 cancels the current state maintaining control of the master aircraft 10 and switches the control to the flight control based on the manual operation by the operator using the remote control device 30.

Furthermore, the flight control means 19 has an information transmission control function. That is, this flight control means 19 generates the altitude information and the two-dimensional position information of the master aircraft 10 on the basis of the information detected by each of the sensors 16b and 16c during the flight and transmits the generated two-dimensional position information and altitude information of the master aircraft 10 to each of the slave aircrafts 20, 20, 20 through the transmitter 18. Each of the slave aircrafts 20 executes autonomous flight control of its own aircraft on the basis of the altitude information and the two-dimensional information of the master aircraft 10 sent from the master aircraft 10.

Subsequently, the slave aircraft 20 will be described. The slave aircraft 20 plays a role of following the master aircraft 10 and suspending the hose 50. This slave aircraft 20 includes, as illustrated in FIGS. 1, 5 and 6, an airframe 21, four rotary blade portions 22, 22, 22, 22, suspending means 23, a gyro sensor 24a, an altitude sensor 24b, a GPS sensor 24c, a receiver 25, a transmitter 26, and flight control means (flight controller) 27.

The airframe 21 of the slave aircraft 20 has, as illustrated in FIG. 5, a fuselage portion 211 located at the center, and arm portions 212a, 212b, 212c, 212d extending in each direction of front, rear, right, and left from the fuselage portion 211. The fuselage portion 211 accommodates the gyro sensor 24a, the altitude sensor 24b, the GPS sensor 24c, the receiver 25, the transmitter 26, and the flight control means 27.

The rotary blade portion 22 is disposed at a distal end portion of the arm portion 212a extending to the front direction, a distal end portion of the arm portion 212b extending to the rear direction, a distal end portion of the arm portion 212c extending to the left direction, and a distal end portion of the arm portion 212d extending to the right direction, respectively, in FIG. 5. Each of the rotary blade portions 22 has a propeller (rotary blade) 221 and a motor (driving means) 222 for rotating/driving the propeller 221 as illustrated in FIGS. 5 and 6. The propeller 221 of each of the rotary blade portions 22 is arranged at the distal end portion of the arm portion so as to rotate in a plane substantially perpendicular to a center axis C2 of the airframe 21. That is, the rotary blade portion 22 of the slave aircraft 20 corresponds to the first rotary blade portion 12 of the master aircraft 10, and the slave aircraft 20 does not have one corresponding to the second rotary blade portion 13 of the master aircraft 10. In this point, a commercial drone or a multicopter or the like can be used as it is for the slave aircraft 20.

The suspending means 23 is for suspending the hose 50 from the airframe 21. A strap or the like having flexibility can be used for the suspending means 23, for example. One of end portions of this suspending means 23 is tied to the airframe 21, while the other end is tied to a predetermined spot of the hose 50. In this embodiment, assuming that the hose 50 is divided into four regions with equal lengths, the suspending means 23 of each of the slave aircrafts 20 is tied to a boundary portion of the adjacent regions.

The gyro sensor 24a, the altitude sensor 24b, and the GPS sensor 24c have the same functions as those of the gyro sensor 16a, the altitude sensor 16b, and the GPS sensor 16c provided on the master aircraft 10, respectively. That is, the gyro sensor 24a is for detecting an attitude (direction/inclination) of the slave aircraft 20 (airframe 21), and the altitude sensor 24b is for detecting an altitude of the slave aircraft 20 (airframe 21). And the GPS sensor 24c is for receiving radio waves from a plurality of GPS satellites and for calculating the two-dimensional position information of the slave aircraft 20 (airframe 21) on the ground on the basis of the received radio waves. The attitude information detected by the gyro sensor 24a, the altitude information detected by the altitude sensor 24b, and the two-dimensional position information obtained by the GPS sensor 24c are sent to the flight control means 27.

The receiver 25 is for receiving the two-dimensional position information and the altitude information of the master aircraft 10 transmitted from the transmitter 18 of the master aircraft 10. Moreover, the transmitter 26 is for transmitting a signal to an outside. In this embodiment, a camera is not mounted on the slave aircraft 20, for example, but if a camera is mounted, the transmitter 26 is used for transmitting information of images photographed by the camera. Moreover, if abnormality occurs in the slave aircraft 20, for example, it is used for transmitting information for notifying the abnormality. The flight control means 27 is for controlling the flight of the slave aircraft 20 (airframe 21) by controlling driving of the motor 222 of each of the rotary blade portions 22. More specifically, the flight control means 27 determines a rotation number and a rotation direction or the like of each motor 222 on the basis of the two-dimensional position information and altitude information of the master aircraft 10 received by the receiver 25 and the information and the like detected by each of the sensors 24a, 24b, and 24c and controls the driving of each motor 222 in accordance with the determined contents. That is, in this embodiment, the flight control means 27 executes full autonomous flight control so that the slave aircraft 20 maintains a predetermined distance with respect to the master aircraft 10 at all times.

Moreover, a battery for supplying power to each motor and the flight control means of the aircraft is mounted on each of the master aircraft 10 and the three slave aircrafts 20, 20, 20. A power supply method to each of the master aircraft 10 and the three slave aircrafts 20, 20, 20 is not limited to the method using the battery, but any method may be used. For example, an engine using a fossil fuel may be mounted on each of the aircrafts instead of the battery. Moreover, power may be supplied to each of the master aircraft 10 and the three slave aircrafts 20, 20, 20 by wired power supply using a power supply line provided along the hose or a wireless power supply.

Figure 7:
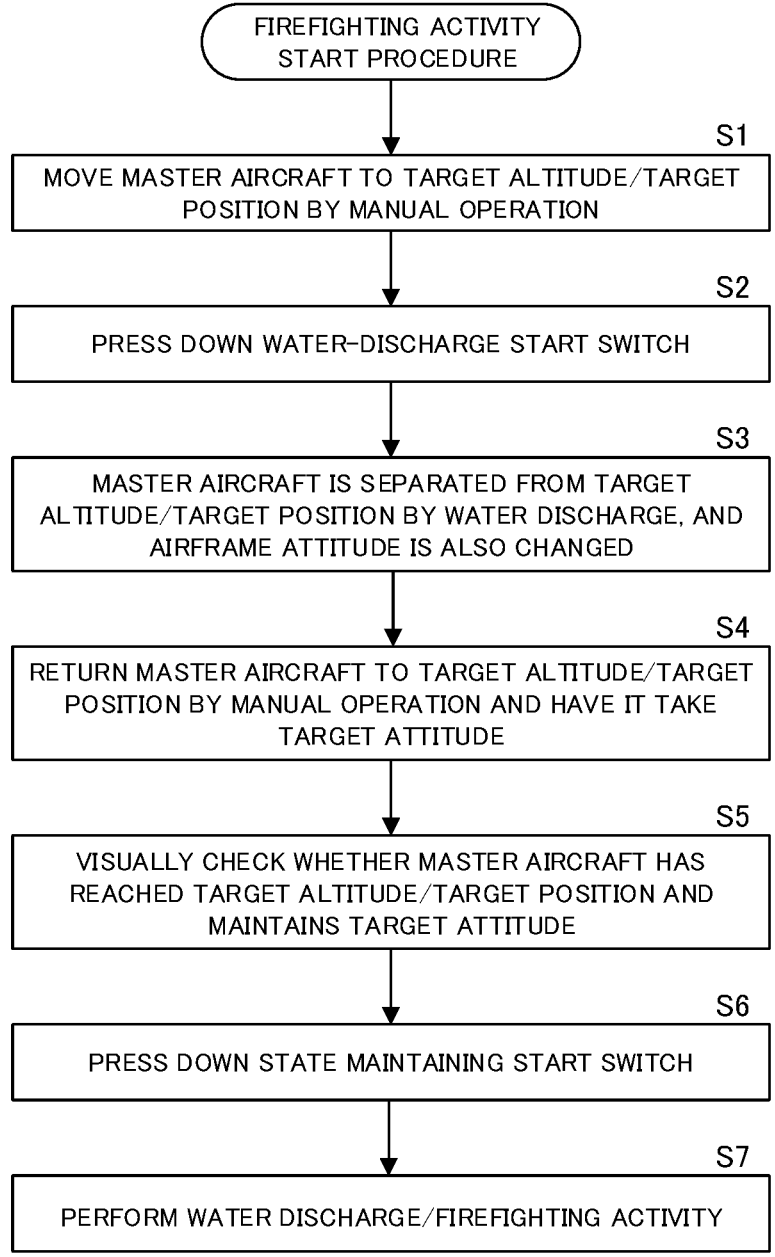
FIG. 7 is a flowchart for explaining an operation procedure of the aircraft system of this embodiment until water discharge is performed at a fire site.
Figure 8:
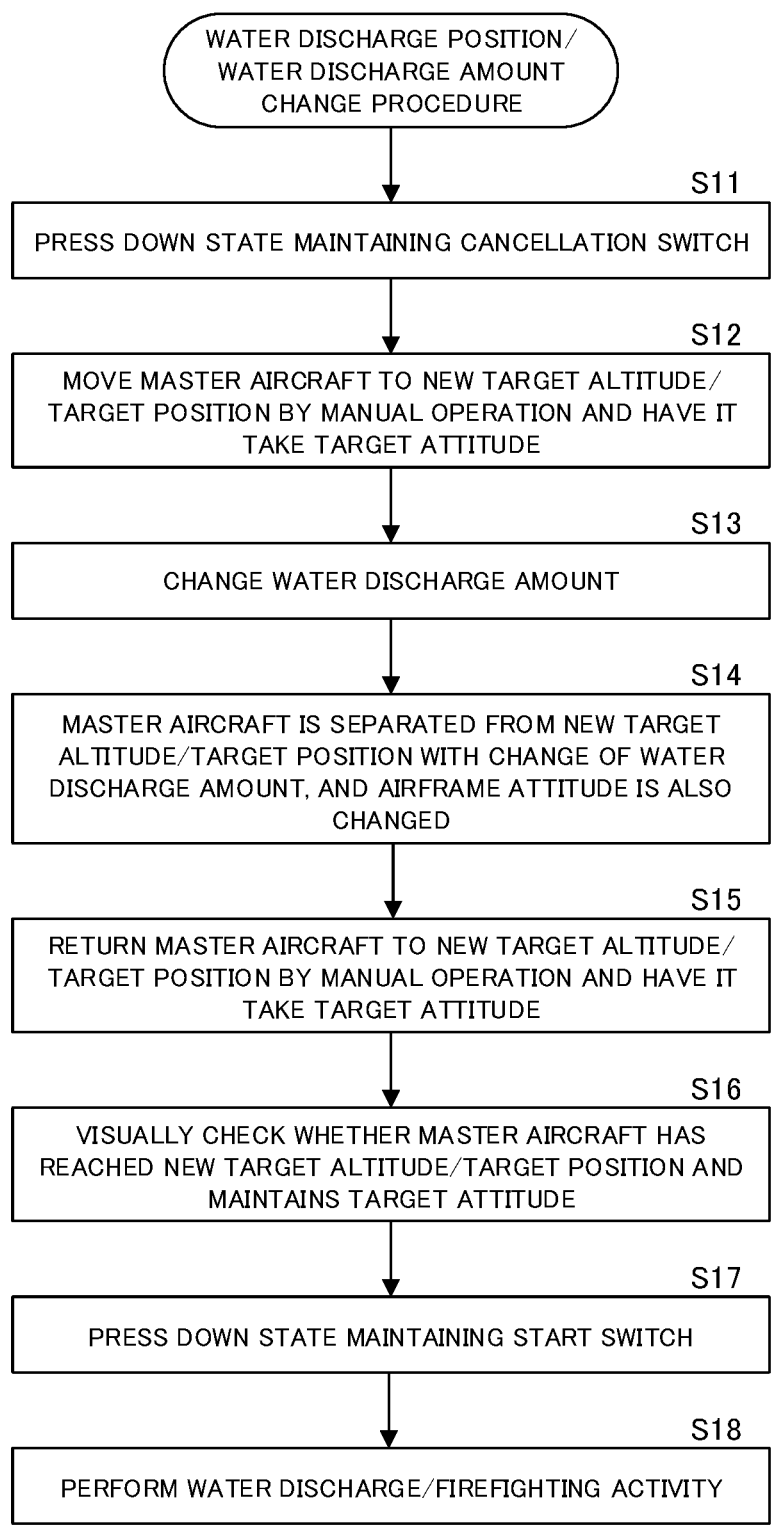
FIG. 8 is a flowchart for explaining an operation procedure of the aircraft system of this embodiment when a water discharge position and a water discharge amount are changed during the water discharge work.

Subsequently, when the aircraft system of this embodiment is used for a firefighting activity, an operation procedure of the aircraft system will be described. FIG. 7 is a flowchart for explaining the operation procedure of the aircraft system of this embodiment until water discharge is performed at the fire site, FIG. 8 is a flowchart for explaining the operation procedure of the aircraft system of this embodiment when the water discharge position and the water discharge amount are changed during the water discharge work.

First, the operation of the aircraft system of this embodiment from a preparation work to the water discharge at the fire site will be described. First, an operator (worker) assembles the aircraft system of this embodiment in the vicinity of the fire site. That is, one of the end portions of the hose 50 is attached to the nozzle 15 of the master aircraft 10, and the other end portion of the hose 50 is attached to the water-discharge pumper vehicle 60. Then, an end portion of the suspending means 23 of each of the slave aircrafts 20 is tied to a predetermined spot of the hose 50.

Subsequently, in accordance with the flowchart illustrated in FIG. 7, the operator starts the aircraft system on the ground, operates the remote control device 30, and causes the master aircraft 10 and the three slave aircrafts 20, 20, 20 to move to the target altitude and the target position where the water discharge is performed (51). However, at this point of time, the operator does not give an instruction to start the water discharge yet. More specifically, the flight control means 19 of the master aircraft 10 determines a rotation number, a rotation direction and the like of the first motor 122 of each of the first rotary blade portions 12 on the basis of the signal related to the flight from the remote control device 30 and the information and the like detected by each of the sensors 16a, 16b, and 16c, and controls the driving of each of the first motors 122 in accordance with the determined contents. In this case, since the water discharge has not been performed yet, the flight control means 19 controls only the driving of the first motor 122 of each of the first rotary blade portions 12 and does not control the driving of the second motor 132 of each of the second rotary blade portions 13. Moreover, the flight control means 19 controls the flight of its own master aircraft 10 and sequentially generates the two-dimensional position information and the altitude information of the master aircraft 10 and then transmits it to each of the slave aircrafts 20 through the transmitter 18. The flight control means 27 of each of the slave aircrafts 20 determines a rotation number, a rotation direction and the like of the motor 222 of each of the rotary blade portions 22 on the basis of the two-dimensional position information and the altitude information of the master aircraft 10 received by the receiver 25 and the information and the like detected by each of the sensors 24a, 24b, and 24c, and controls the driving of each of the motors 222 in accordance with the determined contents. As a result, the master aircraft 10 and the three slave aircrafts 20, 20, 20 perform the flight as a unit in accordance with the instruction by the operator using the remote control device 30.

When the master aircraft 10 reaches the target altitude and the target position, the operator operates the remote control device 30 and causes the master aircraft 10 to take a target attitude. More specifically, the operation is conducted such that the center axis direction of the nozzle 15 which is a water discharge direction is directed to a desired position. Then, when the operator determines by visual recognition that the master aircraft 10 maintains the target attitude at the target altitude and the target position, the operator presses down the water-discharge start switch 33 of the remote control device 30 and also tilts the water-discharge amount lever 35 to the front so as to start the water discharge (S2).

When the microcomputer of the water-discharge pumper vehicle 60 receives the instruction signal to start the water discharge and the instruction signal related to the water discharge amount from the remote control device 30, it causes the pump to be operated and starts the water discharge in the instructed water discharge amount. Moreover, when the flight control means 19 of the master aircraft 10 receives the instruction signal to start the water discharge from the remote control device 30, it stores the contents thereof in the storage means.

When the water discharge is started, water is sent out from the water-discharge pumper vehicle 60 through the hose 50 and is discharged to the outside from the nozzle 15 of the master aircraft 10. At this time, the nozzle 15 receives the reaction force by the water discharge, and the reaction force received by the nozzle 15 is transmitted to the airframe 11 through the connecting tool 14 having rigidity. Thus, the master aircraft 10 is largely separated from the target altitude and the target position where it was located at start of the water discharge, and the attitude of the master aircraft 10 is largely changed in some cases (S3). On the other hand, since each of the slave aircrafts 20 uses the one having flexibility as the suspending means 23 for suspending the hose 50 from the airframe 21, swing of the hose 50 by the reaction force at the water discharge can be made to efficiently escape by the suspending means 23 so that it is not much transmitted to the airframe 21. Thus, the slave aircraft 20 can make a stable flight even during the water discharge.

As described above, when the water discharge is started, and the master aircraft 10 is separated from the target altitude and the target position, the operator operates the remote control device 30 so that the master aircraft 10 returns to the target altitude and the target position and the master aircraft 10 takes the target attitude there (S4). More specifically, the flight control means 19 of the master aircraft 10 determines the rotation number, the rotation direction and the like of each motor on the basis of the signal related to the flight from the remote control device 30 and the information and the like detected by each of the sensors 16a, 16b, and 16c, and controls the driving of each motor in accordance with the determined contents. In this case, since the water discharge is being currently performed, the flight control means 19 controls not only the driving of the first motor 122 of each of the first rotary blade portions 12 but also the driving of the second motor 132 of each of the second rotary blade portions 13. In the master aircraft 10, since each of the second propellers 131 is arranged on the airframe so that the four second propellers 131, 131, 131, 131 rotate on the same plane, a large propelling force can be generated by rotating/driving each of the second propellers 131. Moreover, the direction of the center axis of the nozzle 15 is substantially in parallel with the direction of the rotation axis of the second propeller 131 and thus, the propelling force generated by the four second rotary blade portions 13, 13, 13, 13 can sufficiently counteract the reaction force by the water discharge even if the water discharge is performed vigorously from the nozzle 15. Therefore, the master aircraft 10 and the three slave aircrafts 20, 20, 20 can make a stable flight even during the water discharge from the nozzle 15, and the operator can rapidly return the master aircraft 10 to the target altitude and the target position. Moreover, since the reaction force by the water discharge can be effectively suppressed by the propelling force of the second propeller 131 of each of the second rotary blade portions 13 as above, when the master aircraft 10 is rapidly returned to the target altitude and the target position, the flight control means 19 controls the driving of the first motor 122 of each of the first rotary blade portions 12 and can allow the master aircraft 10 to easily take a target attitude by a propelling force of the first propeller 121 of each of the first rotary blade portions 12.

After that, the operator visually confirms whether the master aircraft 10 has reached the target altitude and the target position and maintains the predetermined attitude or not (S5). Here, even if the operator determines that the master aircraft 10 maintains the predetermined attitude at the original target altitude and target position, it is preferable that the operator visually checks the water discharge situation by the master aircraft 10 to see that the discharged water has actually reached the predetermined position of the fire site. If the water has not reached the predetermined position of the fire site, the operator adjusts the altitude, the position, and the attitude of the master aircraft 10 so that the water reaches the predetermined position of the fire site. When the operator has checked that the master aircraft 10 takes the predetermined attitude at the target altitude and the target position as above, the operator presses down the state maintaining start switch 36 of the remote control device 30 (S6). As a result, the instruction signal to start the state maintaining control for maintaining the current attitude at the current position and altitude for the master aircraft 10 is transmitted from the remote control device 30. When the flight control means 19 receives the instruction signal to start the state maintaining control for the master aircraft 10, it stores the attitude information, the altitude information, and the two-dimensional position information detected by each of the sensors 16a, 16b, and 16c when the instruction signal is received in the storage means and executes the state maintaining control (hovering control) of the master aircraft 10 on the basis of the stored information. As a result, since the master aircraft 10 can maintain the target attitude at the target altitude and the target position, the water is discharged from the nozzle 15 to the desired direction, and the water-discharge/firefighting activity is performed for the fire site (S7).

Subsequently, the operation of the aircraft system of this embodiment when the water discharge position and the water discharge amount are to be changed during the water discharge work will be described. This is performed when such a need occurs that the aircraft system is moved to another position and the water discharge amount is changed during the water discharge work, for example.

First, in accordance with the flowchart illustrated in FIG. 8, the operator presses down the state maintaining cancellation switch 37 of the remote control device 30 and cancels the state maintaining control (hovering control) of the master aircraft 10 (S11). More specifically, when the operator presses down the state maintaining cancellation switch 37, the instruction signal to cancel the state maintaining control is transmitted from the remote control device 30. When the flight control means 19 receives the instruction signal, since it is currently executing the autonomous flight control of the master aircraft 10, it cancels the autonomous flight control and switches to the flight control based on the manual operation by the operator.

Subsequently, the operator operates the remote control device 30 so as to cause the master aircraft 10 to be moved to a new target altitude and target position and to take a target attitude there (S12). At this time, the water discharge may be temporarily stopped, but here, the master aircraft 10 is made to move in the water discharge state. More specifically, the flight control means 19 of the master aircraft 10 determines the rotation number, the rotation direction and the like for the first motor 122 of each of the first rotary blade portions 12 and the second motor 132 of each of the second rotary blade portions 13 on the basis of the signal related to the flight from the remote control device 30, the information detected by each of the sensors 16a, 16b, and 16c and the like, and controls the driving of each motor in accordance with the determined contents.

When the operator determines that the master aircraft 10 has reached the new target altitude and target position and maintains the target attitude by visual recognition, the operator operates the water-discharge amount lever 35 of the remote control device 30 and changes the water discharge amount (S13). When the microcomputer of the water-discharge pumper vehicle 60 receives the instruction signal related to the water discharge amount from the remote control device 30, it changes the water discharge amount to the instructed amount.

When the water discharge amount is changed, the reaction force caused by the water discharge and received by the master aircraft 10 is changed and thus, the master aircraft 10 is separated from the new target altitude and target position located when the water discharge amount was changed and moreover, the attitude of the master aircraft 10 is also changed (S14). When the operator sees that the master aircraft 10 has been separated from the new target altitude and target position, the operator operates the remote control device 30 so as to return the master aircraft 10 to the new target altitude and target position and to take the target attitude there (S15).

After that, the operator visually checks whether the master aircraft 10 has returned to the new target altitude and target position and maintains the predetermined attitude or not (S16). Then, after the operator confirms that the master aircraft 10 has taken the predetermined attitude at the new target altitude and target position, the operator presses down the state maintaining start switch 36 of the remote control device 30 (S17). As a result, the instruction signal to start the state maintaining control for maintaining the current attitude at the current altitude and position for the master aircraft 10 is transmitted from the remote control device 30. When the flight control means 19 receives the instruction signal to start the state maintaining control for the master aircraft 10, it stores the attitude information, altitude information, two-dimensional position information detected by each of the sensors 16s, 16b, and 16c when the instruction signal was received in the storage means and executes the state maintaining control (hovering control) of the master aircraft 10 on the basis of the stored information. As a result, the master aircraft 10 moves to the new target altitude and target position, and the water discharge/firefighting activity is performed with the changed water discharge amount (S18).

Here, the case in which the aircraft system is made to fly in combination of the manual operation by the operator and the state maintaining control based on the autonomous flight control is described, but it is needless to say that the aircraft system of this embodiment is capable of flight only by the manual operation by the operator or of automatic flight by the full autonomous flight control.

In the aircraft system of this embodiment, since the master aircraft includes the four first rotary blade portions having the first propeller arranged on the airframe so as to rotate in the plane substantially perpendicular to the center axis of the airframe, the four second rotary blade portions having the second propeller arranged on the airframe so as to rotate in the plane substantially orthogonal to the plane in which the first propeller rotates, and the nozzle fixed to the airframe and to which the hose for sending out the water is attached, the second rotary blade portion of the master airframe can be used for obtaining the propelling force against the reaction force when the water is discharged from the nozzle and thus, the master aircraft can make a stable flight even during the water discharge from the nozzle. Moreover, the slave aircraft includes the suspending means having flexibility for suspending the hose from the airframe, and the suspending means can allow the swing of the hose caused by the reaction force during the water discharge to escape so that the influence is not much transmitted to the airframe and thus, the slave aircraft can make a stable flight even during the water discharge from the nozzle. Moreover, since the slave aircraft follows the master aircraft while supporting the hose by suspending it, even if a long hose is used, the hose can be suspended by a plurality of the aircrafts and can be easily transported to a high position or a far site.

Moreover, in the aircraft system of this embodiment, each of the second propellers of the master aircraft is arranged on the airframe so that the four second propellers rotate in the same plane, and also, the direction of the center axis of the nozzle is set substantially in parallel with the direction of the rotation axis of the second propeller, and thus, by rotating/driving each of the second propellers, each of the second rotary blade portions generates a propelling force in the same direction, and a large propelling force can be generated by the four second rotary blade portions as a whole. Moreover, since the direction of the center axis of the nozzle is substantially in parallel with the direction of the rotation axis of the second propeller, the propelling force generated by the four second rotary blade portions can sufficiently counteract the reaction force caused by the water discharge even if the water discharge is performed vigorously from the nozzle. Furthermore, in this embodiment, by detachably fixing the nozzle to the airframe of the master aircraft through the connecting tool made of a material having rigidity, the propelling force generated by the second rotary blade portion can be efficiently transmitted to the nozzle.

Moreover, in the aircraft system of this embodiment, when the water discharge is not performed from the nozzle, the flight control means of the master aircraft controls the flight of the master aircraft by controlling the driving of each of the first motors without controlling the driving of each of the second motors, and when the water discharge is performed from the nozzle, it controls the flight of the airframe of the master aircraft by controlling the driving of each of the first motors and by controlling the driving of each of the second motors and thus, the four second rotary blade portions are operated only at the water discharge from the nozzle, whereby power consumption can be kept as low as possible.

Moreover, in the aircraft system of this embodiment, the flight control means of the master aircraft controls the flight of its own aircraft in accordance with the signal related to the flight transmitted from the remote control device, and the flight control means of each of the slave aircrafts obtains the altitude information and the position information of the master aircraft from the master aircraft by using the art of wireless communication and performs the autonomous flight control for controlling the altitude and position of its own aircraft on the basis of the obtained information so that control of a flight of the master aircraft and the slave aircraft as a unit is extremely easy.

The present invention is not limited to the aforementioned embodiment but is capable of various variations within a range of the gist thereof.

In the aforementioned embodiment, the case in which each of the second propellers is provided in the airframe so that the second propellers of the four second rotary blade portions rotate in the same plane in the master aircraft is described, but the four second propellers do not necessarily have to be arranged so as to rotate in the same plane as long as the directions of the rotation axes of the four second propellers are substantially in parallel with each other. That is, each of the second propellers may be arranged on the airframe so that the plane (rotation plane) in which each of the second propellers rotates is substantially in parallel with each other.

Moreover, in the aforementioned embodiment, the case in which the second propeller of each of the second rotary blade portions is arranged on the airframe of the master aircraft so as to rotate in the plane substantially orthogonal to the plane (rotation plane) in which the first propeller rotates is described, but the plane (rotation plane) in which the second propeller rotates does not necessarily have to be orthogonal to the rotation plane of the first propeller. That is, an angle formed by the rotation plane of the second propeller and the rotation plane of the first propeller may be a certain angle other than 90 degrees. More specifically, each of the second propellers is preferably arranged on the airframe so as to rotate in such a plane that the angle formed with the rotation plane of the first propeller is within a range from 45 to 90 degrees. If the angle formed between the rotation plane of the second propeller and the rotation plane of the first propeller is a predetermined angle within the range from 45 to 90 degrees, each of the second rotary blade portions is considered to effectively generate the propelling force against the reaction force caused by the water discharge. In general, the second propeller of each of the second rotary blade portions only needs to be arranged on the airframe of the master aircraft so as to obtain the propelling force against the reaction force when the water is discharged to the outside from the nozzle through the hose. As a result, the second rotary blade portion can be used in order to obtain the propelling force against the reaction force when the liquid is discharged to the outside from the nozzle through the hose.

Moreover, in the aforementioned embodiment, the case in which the master aircraft has the four first rotary blade portions and the four second rotary blade portions is described, but one, two, three or five or more first rotary blade portions may be provided in the master aircraft. Moreover, one, two, three or five or more second rotary blade portions may be provided in the master aircraft. Furthermore, by providing an angle adjustment mechanism for adjusting the rotation axis direction of the first rotary blade on one or a plurality of the first rotary blade portions in the plurality of first rotary blade portions provided in the master aircraft, the flight control means can use the first rotary blade portion in which the rotation axis direction of the first rotary blade was changed as the second rotary blade portion by changing the rotation axis direction of the first rotary blade in the first rotary blade portion having the angle adjustment mechanism. In this case, the aforementioned second rotary blade portion can be omitted.

Figure 11:
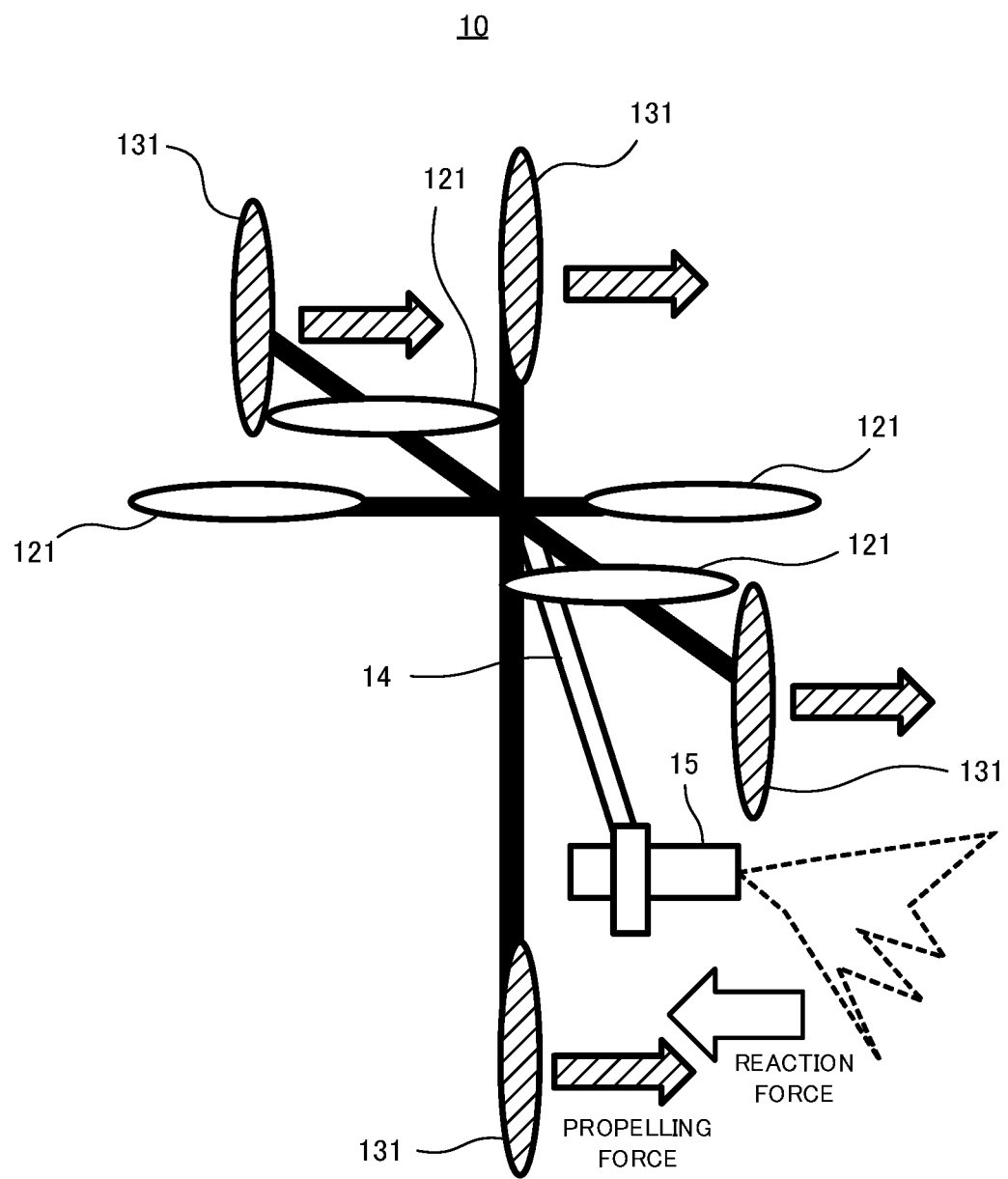
FIG. 11 is a conceptual diagram of the master aircraft in which a nozzle is arranged closer to a center side of an airframe than a position of each of second rotary blades when four second rotary blade portions are provided in the master aircraft.
Figure 12:
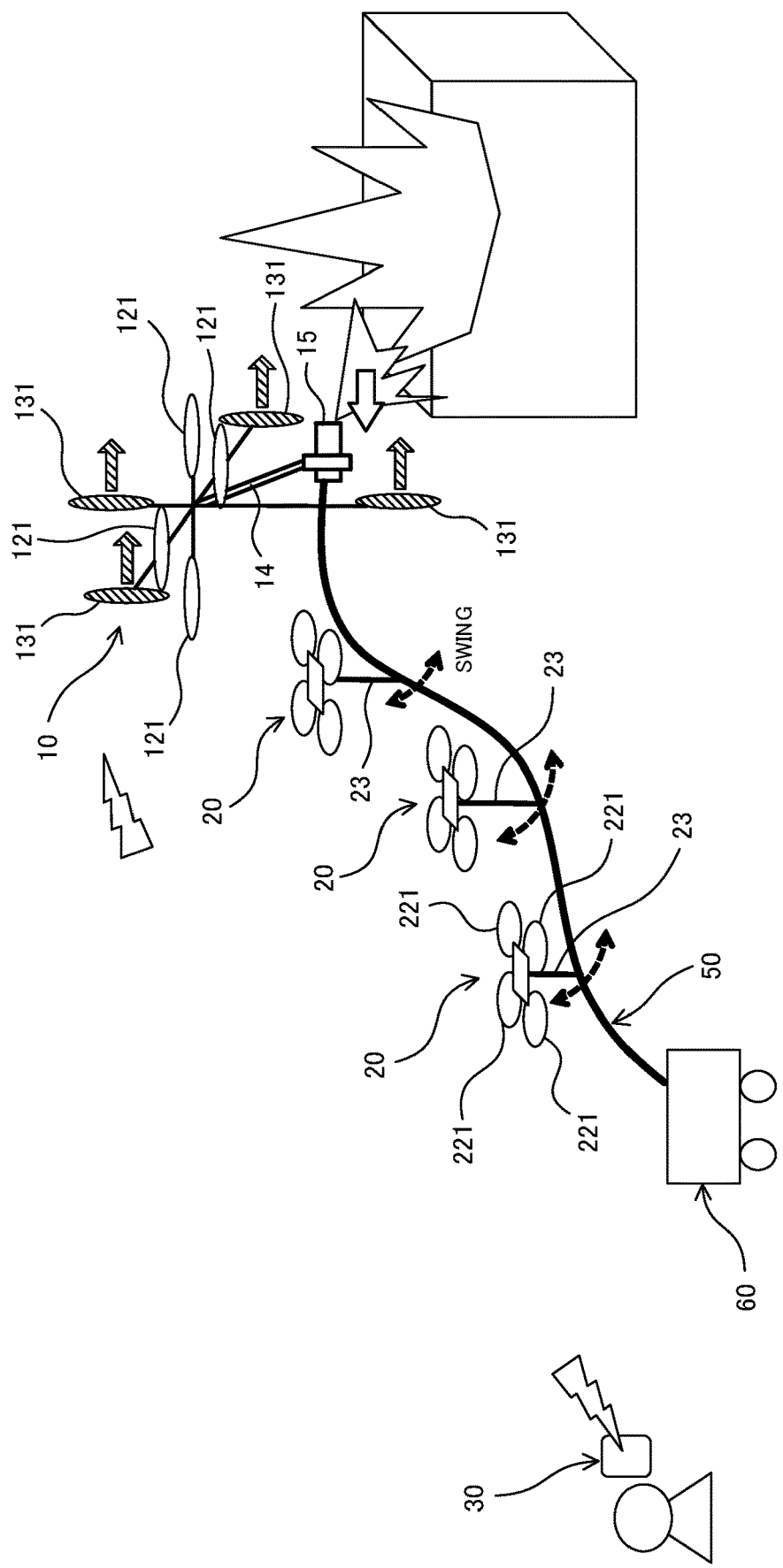
FIG. 12 is a conceptual diagram of the aircraft system including the master aircraft illustrated in FIG. 11.
Figure 13:
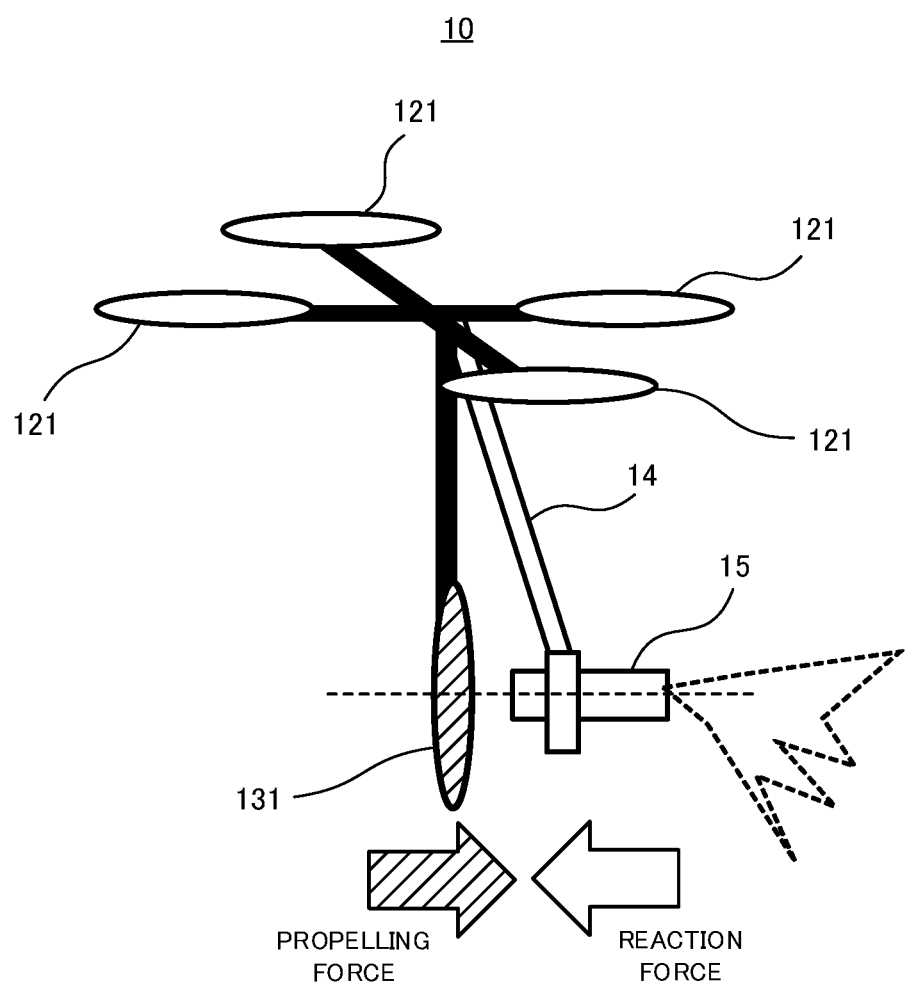
FIG. 13 is a conceptual diagram of the master aircraft in which the nozzle is arranged so that a center axis of the nozzle and a rotation axis of the second rotary blade are located on the same straight line when only one second rotary blade portion is provided on the master aircraft.
Figure 14:
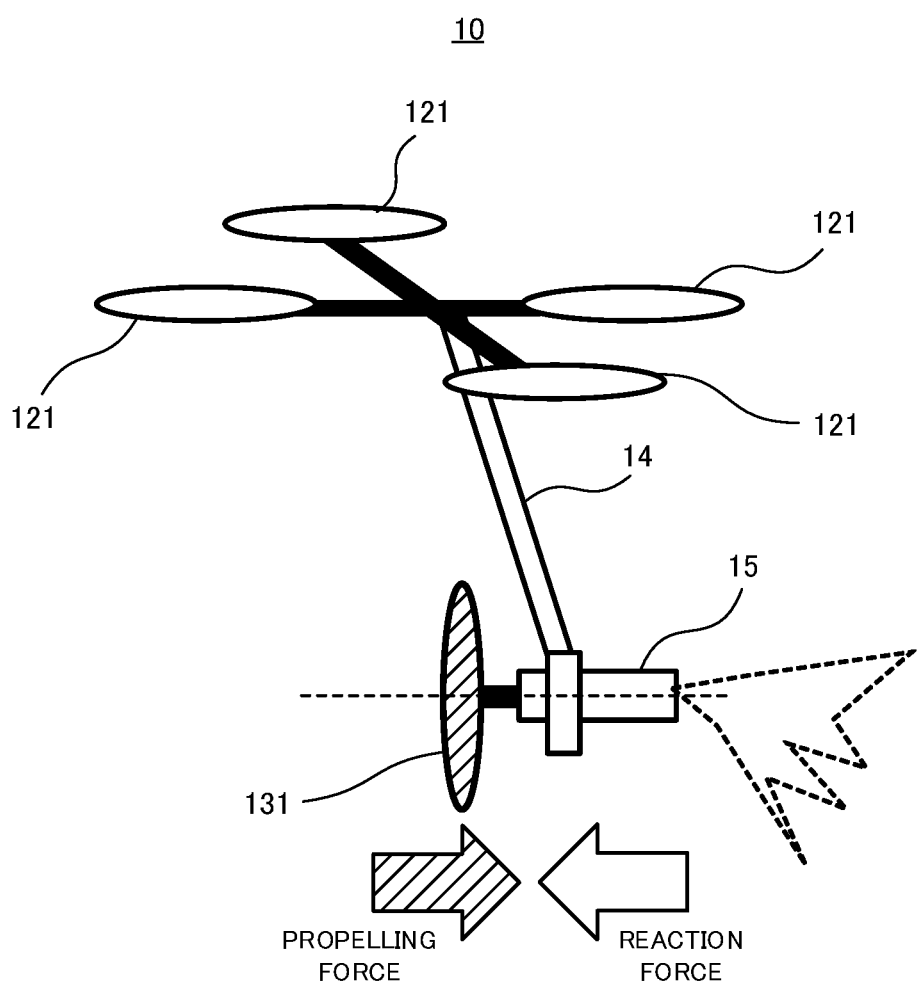
FIG. 14 is a conceptual diagram of the master aircraft in which the nozzle is arranged so that the center axis of the nozzle and the rotation axis of the second rotary blade are located on the same straight line when only one second rotary blade portion is provided on the master aircraft.

Particularly if a plurality of the second rotary blade portions is provided in the master aircraft, the nozzle is preferably provided in the master aircraft so that it is located closer to the center side of the airframe than the position of each of the second rotary blades. More specifically, when the four second rotary blade portions are provided in the master aircraft, a conceptual diagram of the master aircraft in which the nozzle is arranged so as to be located closer to the center side of the airframe than the position of each of the second rotary blades is illustrated in FIG. 11, and a conceptual diagram of the aircraft system including the master aircraft is illustrated in FIG. 12. As described above, by arranging the nozzle 15 closer to the center side of the airframe than the position of each of the second rotary blades in the master aircraft 10, rotation of the airframe caused by a moment of force by the reaction force at the water discharge from the nozzle 15 and the propelling force by each of the second rotary blade portions 131 can be prevented, and a stable flight can be easily realized. On the other hand, when only one second rotary blade portion is provided in the master aircraft, the nozzle is preferably provided in the master aircraft so that the center axis of the nozzle and the rotation axis of the second rotary blade are located on the same straight line. More specifically, conceptual diagrams of the master aircraft in which the nozzle is arranged so that the center axis of the nozzle and the rotation axis of the second rotary blade are located on the same straight line when only one second rotary blade portion is provided in the master aircraft are illustrated in FIGS. 13 and 14. Here, In FIG. 13, the second rotary blade portion 131 is configured to be separated from the nozzle 15, and in FIG. 14, the second rotary blade portion 131 is configured integrally with the nozzle 15. As described above, in the master aircraft 10, by arranging the nozzle 15 so that the center axis of the nozzle 15 and the rotation axis of the second rotary blade are located on the same straight line, the rotation of the airframe caused by the moment by the reaction force at the water discharge from the nozzle 15 and the propelling force by the second rotary blade portion 131 can be prevented, and a stable flight can be easily realized.

Figure 15:
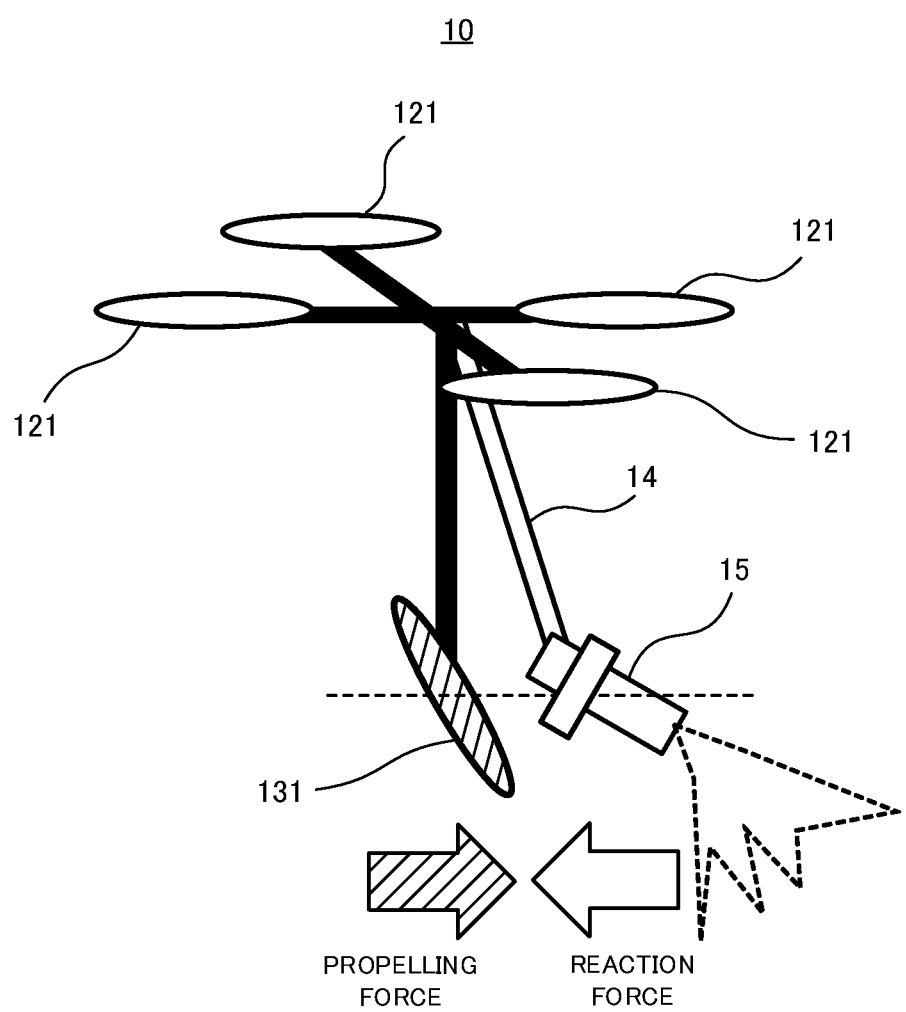
FIG. 15 is a conceptual diagram of the master aircraft in which the center axis of the nozzle and the rotation axis of the second rotary blade are not located on the same straight line when only one second rotary blade portion is provided on the master aircraft.
Figure 16:
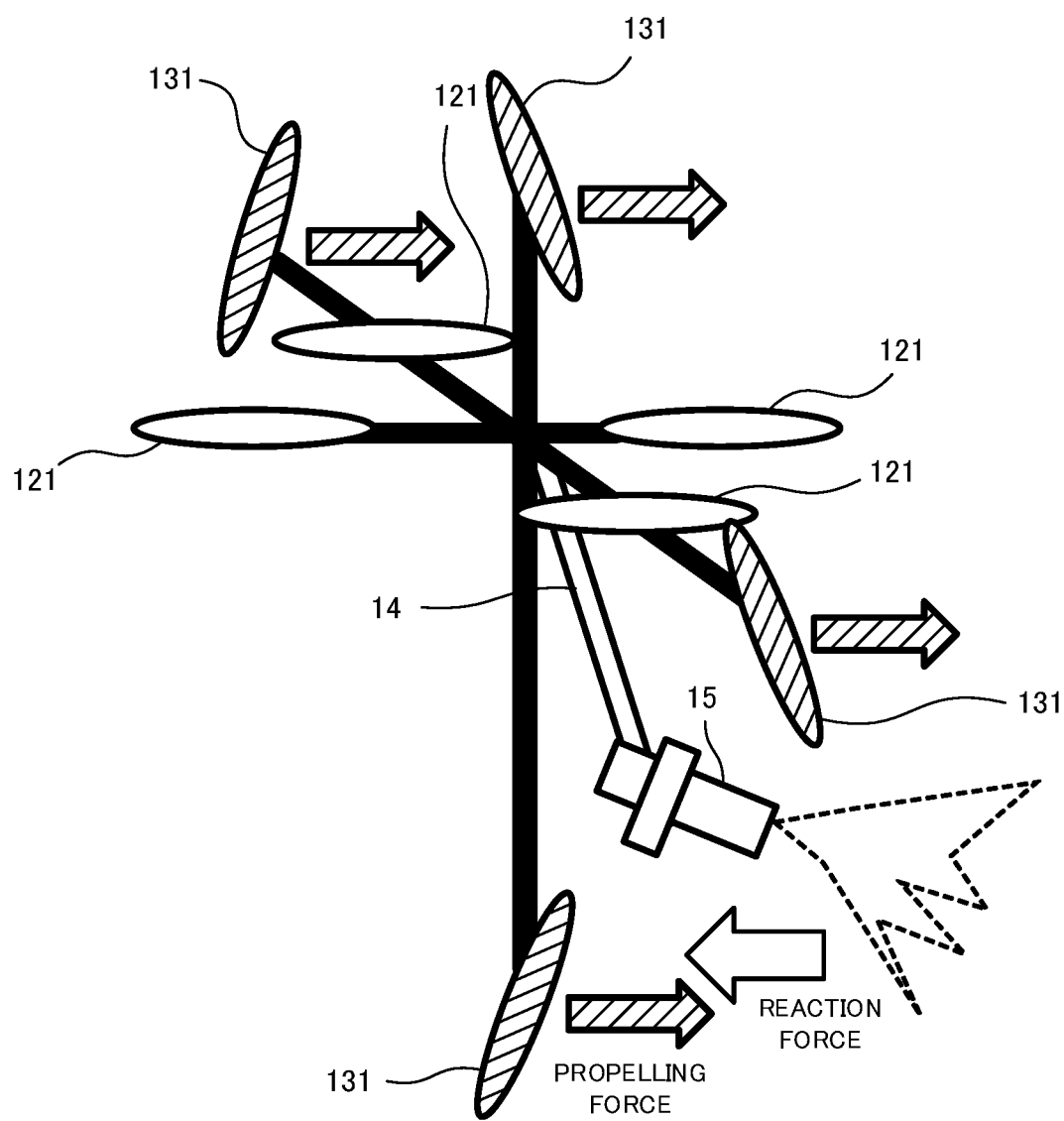
FIG. 16 illustrates a conceptual diagram of the master aircraft in which the rotation axes of the two second rotary blades are substantially in parallel with the center axis of the nozzle and the rotation axes of the other two second rotary blades are not in parallel with the center axis of the nozzle when the four second rotary blade portions are provided on the master aircraft.

In general, if the second rotary blade portion can be used for obtaining the propelling force against the reaction force when the liquid is discharged to the outside from the nozzle through the hose, the center axis of the nozzle and the rotation axis of the second rotary blade do not necessarily have to be located on the same straight line. For example, if only one second rotary blade portion is provided in the master aircraft, a straight line connecting the center of the reaction force acting on the nozzle and a center of the force acting on the second rotary blade may be different from the center axis of the nozzle and the rotation axis of the second rotary blade. That is, the second rotary blade may be directed to any direction. A conceptual diagram of the master aircraft 10 in which the center axis of the nozzle 15 and the rotation axis of the second rotary blade are not located on the same straight line when only one second rotary blade portion 131 is provided on the master aircraft 10 is illustrated in FIG. 15. Moreover, when a plurality of the second rotary blade portions is provided on the master aircraft, the rotation axis of each of the second rotary blades may be different from the center axis of the nozzle. When the four second rotary blade portions 131 are provided on the master aircraft 10, a conceptual diagram of the master aircraft 10 in which the rotation axes of two second rotary blades are substantially in parallel with the center axis of the nozzle 15 and the rotation axes of the other two second rotary blades are not in parallel with the center axis of the nozzle 15 is illustrated in FIG. 16.

Moreover, in the aforementioned embodiment, the case in which the slave aircraft has four rotary blade portions is described, but one, two, three or five or more rotary blade portions may be provided in the slave aircraft.

Furthermore, in the aircraft system of the aforementioned embodiment, one having a fixed blade other than the rotary blade may be used for the master aircraft or the slave aircraft.

In the aforementioned embodiment, the case in which the nozzle is detachably fixed to the airframe through the connecting tool made of a material having rigidity in the master aircraft is described, but the nozzle may be detachably provided directly on the aircraft, for example.

Figure 17:
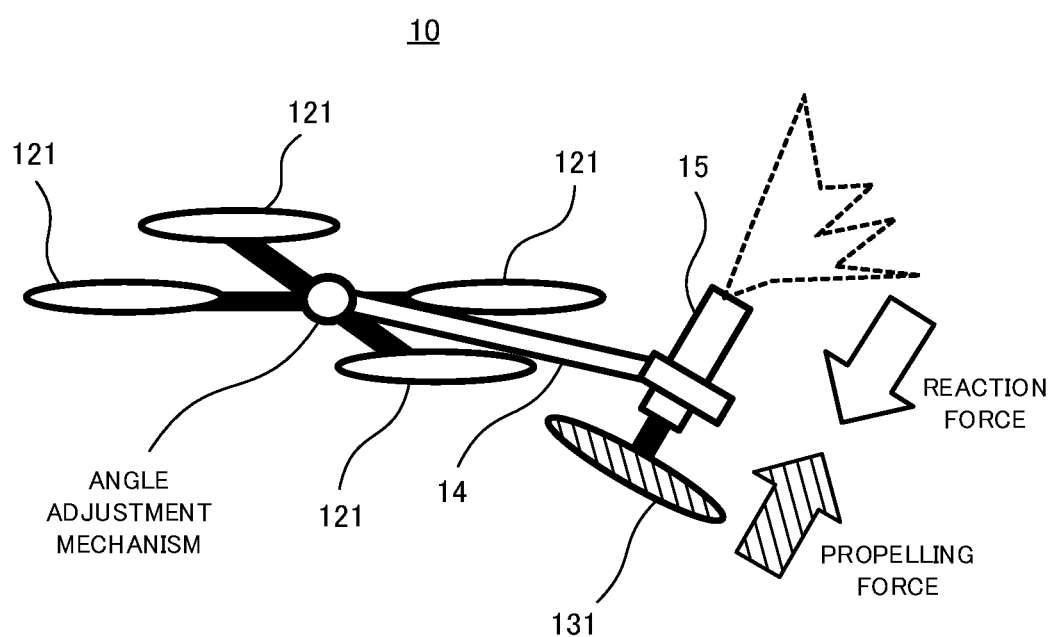
FIG. 17 is a conceptual diagram of the master aircraft including a mechanism for adjusting a rotation axis direction of the second rotary blade with respect to the rotation axis direction of the first rotary blade and a mechanism for adjusting a direction in which a reaction force acts at water discharge from the nozzle with respect to the rotation axis direction of the first rotary blade.

Moreover, in the aircraft system of the aforementioned embodiment, the master aircraft preferably includes a mechanism for adjusting the rotation axis direction of the second rotary blade with respect to the rotation axis direction of the first rotary blade and a mechanism for adjusting the direction in which the reaction force acts at the water discharge from the nozzle with respect to the rotation axis direction of the first rotary blade. By adjusting the direction in which the reaction force acts at the water discharge from the nozzle with respect to the rotation axis direction of the first rotary blade, the water can be discharged from the nozzle to any direction. Moreover, even when the water is discharged from the nozzle to any direction, the reaction force at the water discharge can be effectively cancelled by the propelling force generated by the second rotary blade portion by adjusting the rotation axis direction of the second rotary blade with respect to the rotation axis direction of the first rotary blade. As a specific example, a conceptual diagram of the master aircraft including the mechanism for adjusting the rotation axis direction of the second rotary blade with respect to the rotation axis direction of the first rotary blade and the mechanism for adjusting the direction in which the reaction force acts at the water discharge from the nozzle with respect to the rotation axis direction of the first rotary blade are illustrated in FIG. 17. In FIG. 17, the master aircraft 10 including only one second rotary blade portion 131 is illustrated. This second rotary blade portion 131 is configured integrally with the nozzle 15, and the center axis of the nozzle 15 and the rotation axis of the second rotary blade are arranged on the same straight line. The connecting tool 14 connecting the nozzle 15 and the airframe of the master aircraft 10 to each other includes the angle adjustment mechanism capable of rotating the connecting tool 14 only by a desired angle around a connection position with the master aircraft 10. That is, in the example of FIG. 17, the angle adjustment mechanism of the connecting tool 14 plays roles of the mechanism for adjusting the rotation axis direction of the second rotary blade with respect to the rotation axis direction of the first rotary blade and the mechanism for adjusting the direction in which the reaction force acts at the water discharge from the nozzle 15 with respect to the rotation axis direction of the first rotary blade. In general, a shape of the connecting tool does not have to be linear but may be curved or bent and the like. Moreover, instead of direct provision of one angle adjustment mechanism in the master aircraft, one or a plurality of the angle adjustment mechanisms may be provided between the master aircraft and the nozzle through a plurality of the connecting tools.

Figure 9:
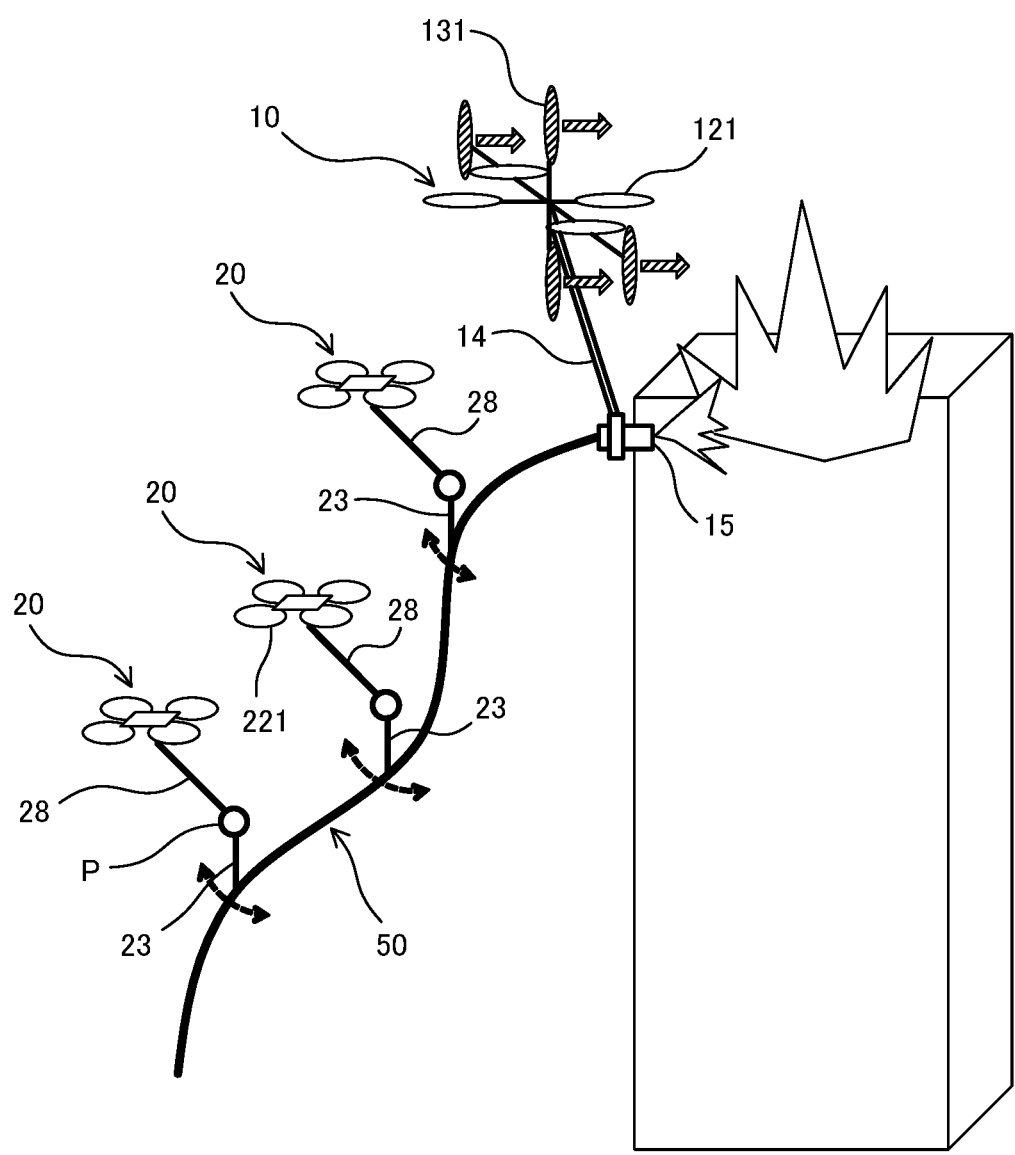
FIG. 9 is a conceptual diagram of the aircraft system of the present invention including a slave aircraft of a variation.

In the aforementioned embodiment, the case in which the hose is suspended from the airframe of the slave aircraft by using the suspending means having flexibility such as a strap in the slave aircraft is described, but the hose may be suspended from the airframe of the slave aircraft by using a rod-shaped connecting member made of a material having rigidity such as metal, carbon, high-hardness plastic and the like instead of the suspending means. In this case, one of end portions of the connecting member is fixed to the airframe of the slave aircraft, and the hose is attached to the other end portion of the connecting member. Moreover, as illustrated in FIG. 9, the slave aircraft 20 may be configured to include both the aforementioned rod-shaped connecting member 28 having rigidity and the suspending means 23 having flexibility such as a strap. That is, the hose 50 may be suspended by the connecting member 28 provided in the airframe of the slave aircraft 20 by using the suspending means 23. In this case, one of end portions of the connecting member 28 is fixed to the airframe of the slave aircraft 20, and one of end portions of the suspending means 23 is attached to the other end portion of the connecting member 28. Then, the hose 50 is attached to the other end portion of the suspending means 23. By using the slave aircraft 20 with such configuration, the hose 50 swings around a contact P between the connecting member 28 and the suspending means 23 during the flight or at the water discharge, but the swing of the hose 50 can be efficiently made to escape by the suspending means 23, and the hose 50 can be reliably separated from the airframe of the slave aircraft 20 by a certain distance according to the length of the connecting member 28. Thus, when the aircraft system of the present invention is used for a firefighting activity at a high floor of a high-rise building, for example, occurrence of such a situation that the hose 50 is brought into contact with the propeller 221 of the slave aircraft 20 and is cut off can be avoided.

Moreover, in the aforementioned embodiment, the case in which a remote control type is used as the remote control device is described, but a smartphone or a tablet terminal incorporating an application may be used as the remote control device.

In the aforementioned embodiment, the case in which the flight control means of the master aircraft controls the flight of the master aircraft by controlling the driving of the first motor of each of the first rotary blade portions without controlling the driving of the second motor of each of the second rotary blade portions when the water discharge is not performed from the nozzle and controls the flight of the airframe by controlling the driving of the first motor of each of the first rotary blade portions and also by controlling the driving of the second motor of each of the second rotary blade portions when the water discharge is performed from the nozzle is described. However, the present invention is not limited to that but the flight control means of the master aircraft may be configured to control the flight of the airframe by controlling the driving of the first motor of each of the first rotary blade portions and also by controlling the driving of the second motor of each of the second rotary blade portions, for example, whether the water discharge is performed from the nozzle or not.

Moreover, in the aforementioned embodiment, the case in which only the master aircraft receives the signal related to the flight from the remote control device, and each of the slave aircrafts controls the position and the altitude of its own aircraft on the basis of the position information and the altitude information of the master aircraft transmitted from the master aircraft and the information detected by each of the sensors is described, but it may be so configured that each of the slave aircrafts receives the signal related to the flight from the remote control device and controls the position and the altitude of its own aircraft on the basis of the received signal related to the flight, the position information and the altitude information of the master aircraft transmitted from the master aircraft, and the information detected by each of the sensors.

Moreover, in the aforementioned embodiment, the case in which the flight control means of each of the slave aircrafts obtains the altitude information and the position information of the master aircraft from the master aircraft by using the art of wireless communication and controls the altitude and the position of its own aircraft on the basis of the obtained altitude information and position information is described, but the art that the flight control means of each of the slave aircrafts obtains the altitude information and the position information of the master aircraft is not limited to the art of the wireless communication but any one or a combination of at least two of the arts of wired communication, image recognition, and acoustic communication may be used.

Furthermore, in the aircraft system of the aforementioned embodiment, the case in which the master aircraft and each of the slave aircrafts have various sensors mounted and can perform an autonomous flight on the basis of the information obtained by those sensors is described, but each of the aircrafts does not necessarily have to have the autonomous flight control function. In this case, an altitude sensor or a GPS sensor does not have to be mounted on each of the aircrafts, and each of the aircrafts is operated manually by the operator.

In the aforementioned embodiment, the case in which the aircraft system of the present invention includes three slave aircrafts is described, but the aircraft system may include one, two or four or more slave aircrafts. More specifically, the number of slave aircrafts is preferably increased/decreased in accordance with the length of the hose, a transportation distance of the hose and the like.

Moreover, in the aforementioned embodiment, the case in which the aircraft system of the present invention includes three slave aircrafts is described, but the aircraft system does not have to include the slave aircrafts. That is, the master aircraft alone may transport the hose. Even in this case, since one or a plurality of the second rotary blade portions configured so that the rotation plane of the second propeller is substantially orthogonal to the rotation plane of the first propeller is provided in addition to the plurality of first rotary blade portions in the master aircraft, the second rotary blade portion can be used for obtaining the propelling force against the reaction force at the water discharge from the nozzle and thus, the master aircraft can make a stable flight even at the water discharge from the nozzle.

Furthermore, in the aforementioned embodiment, the case in which the microcomputer is mounted on the water-discharge pumper vehicle, and this microcomputer receives the signal related to the water discharge from the remote control device and automatically controls the driving of the pump is described, but an existing water discharge vehicle on which the microcomputer is not mounted can be used as the water-discharge pumper vehicle. In this case, a worker of the water discharge vehicle contacts with the operator and manually operates start of the water discharge, stop of the water discharge, adjustment of the water discharge amount and the like in accordance with a request of the operator.

In addition, in the aforementioned embodiment, the case in which the aircraft system of the present invention is used for the firefighting activity is described, but it can be used in various works, not only for the firefighting activities, in which a liquid is discharged such as a cleaning work of a large-sized building, an aircraft and the like, a spraying work of pesticide or fertilizer on farmlands, a pest control work such as bees and the like, for example. Particularly when the aircraft system of the present invention is used in an agricultural work, the hose is used for sending out the liquid such as a pesticide, a liquid fertilizer and the like.

More specifically, when the aircraft system of this embodiment is used for the cleaning work, for example, the master aircraft of the aircraft system preferably includes one or a plurality of rotating brushes for cleaning together with the nozzle. Here, as each of the rotating brushes, a so-called electric rotating brush, that is, the one including a rotatable brush portion and a brush motor for rotating/driving the brush portion is used. The rotation start/rotation stop and the like of each of the brush motors are controlled by the flight control means of the master aircraft upon receipt of a predetermined signal from the remote control device 30, for example. Moreover, each of the rotating brushes is mounted to the airframe, the nozzle or the connecting tool so as to be located on the front side or in the vicinity of the nozzle from which the water is sent out. For example, each of the rotating brushes is arranged so that its rotation axis is substantially in parallel with the center axis of the nozzle. Moreover, each of the rotating brushes is arranged on the front of the airframe or any of the propellers so that the cleaning work can be reliably performed by using each of the rotating brushes by appropriately designing a shape, a length, an inclination angle and the like of the connecting tool. Actually, during the cleaning work, the water is discharged from the nozzle and at the same time, each of the rotating brushes is rotated/driven and each of the rotating brushes is pressed onto a surface of a cleaning target by using a large propelling force by the second propeller. As a result, efficient cleaning can be realized for the cleaning target. Particularly, as the connecting tool, the one including a mechanism capable of freely changing the angle along the surface of the cleaning target may be used. Alternatively, instead of including such mechanism, the angle of the connecting tool with respect to the surface of the cleaning target may be changed by the attitude control of the master aircraft. Moreover, if a plurality of the rotating brushes is provided in the master aircraft, by rotating/driving the adjacent rotating brushes in directions opposite to each other during the cleaning work, reactions of the brush rotating forces are mutually cancelled, and thus, contribution can be made to the stable flight. As the rotating brush, instead of the one with the brush portion rotated/driven by the brush motor, the one configured to be rotated by a flow of the water sent out from the nozzle may be used.

Moreover, when the aircraft system including the master aircraft on which such rotating brush is mounted is to be used, since water does not necessarily have to be discharged to a far place in the cleaning work, unlike the firefighting activity, an operation not using the pumper vehicle such that the hose is connected to a waterline for general households, and water is discharged from the nozzle and the like can be considered. In the aircraft system using such waterline for general households, since the water discharge force is weak, it is difficult to pump up the water to a high floor from the ground when an outer wall of a high-rise building is to be cleaned, but the problem is solved by supplying the water from a high floor to a low floor by using the waterline for general households on the high floor, not by pumping up the water to the high floor from the pumper vehicle on the ground as in the aircraft system for the firefighting activity. The aircraft system for the cleaning work using the waterline for general households described here can be naturally used as an aircraft system for the firefighting activity using the waterline for general households by removing the rotating brush or without removing it, though the water discharge force is weak. For example, if the aircraft system for the firefighting activity can act at a height of the high floor, the water can be effectively discharged to the lower floors as a firefighting target by using the water facilities of the high floor.

The master aircraft on which the rotating brush is mounted described here can be also used as an aircraft exclusively for the cleaning work without mounting the water discharge nozzle. With such aircraft, cleaning is performed by pressing the rotating brush onto the surface of the cleaning target, but at that time, the propelling force by the second propeller can be mainly used to counteract the force from the surface of the cleaning target. Thus, from a dynamic point of view, the aircraft on which the rotating brush is mounted instead of the water discharge nozzle and the aircraft in the aforementioned embodiment on which the water discharge nozzle s mounted are similar inventions realized under the identical technical idea.

Figure 10:
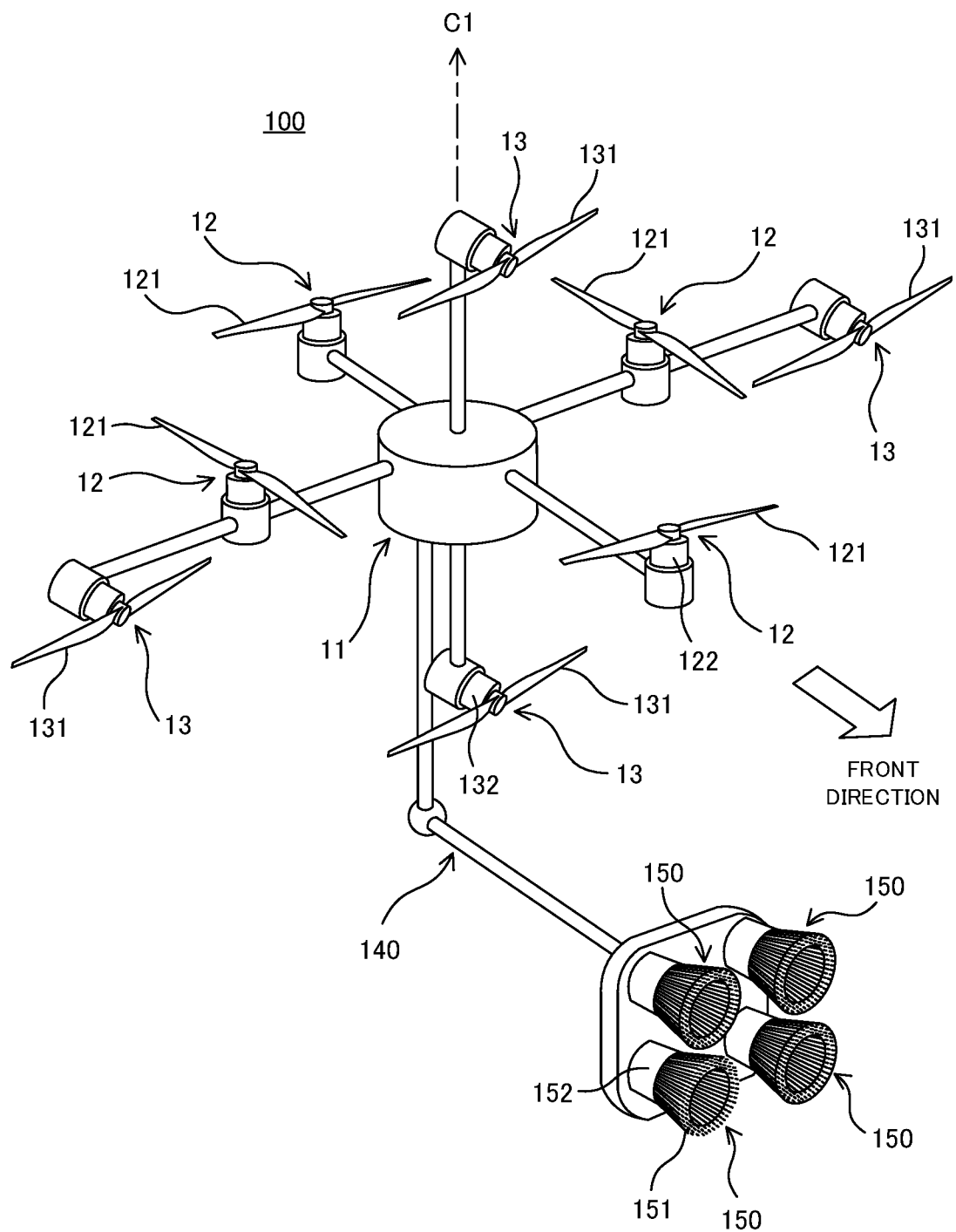
FIG. 10 is a conceptual diagram of the aircraft for a cleaning work which is a variation of the present invention.

The aircraft for the cleaning work on which the electric rotating brush is mounted instead of the water discharge nozzle will be described in detail. FIG. 10 is a schematic diagram of the aircraft for the cleaning work which is a variation of the present invention. As illustrated in FIG. 10, the aircraft 100 of this variation includes the airframe 11, four units of the first rotary blade portions 12, 12, 12, 12, four units of the second rotary blade portions 13, 13, 13, 13, a connecting tool 140, four electric rotating brushes 150, 150, 150, 150 mounted on the airframe 11 through the connecting tool 140, the gyro sensor, the altitude sensor, the GPS sensor, the receiver, the transmitter, and the flight control means. Here, those in the aforementioned embodiment are used for the airframe 11, the four first rotary blade portions 12, 12, 12, 12, the four second rotary blade portions 13, 13, 13, 13, the gyro sensor, the altitude sensor, the GPS sensor, the receiver, and the transmitter.

Similarly to the aforementioned embodiment, each of the first rotary blade portions 12 has the first propeller 121 and the first motor 122 for rotating/driving the first propeller 121, and each of the second rotary blade portions 13 has the second propeller 131 and the second motor 132 for rotating/driving the second propeller 131. Here, each of the first propellers 121 is arranged on the airframe so as to rotate in a plane substantially perpendicular to a center axis C1 of the airframe 11. Moreover, each of the second propellers 131 is arranged on the airframe 11 so that the plane in which each of the second propellers 131 rotates forms a predetermined angle with the plane in which the first propeller 121 rotates. More specifically, in this variation, each of the second propellers 131 is arranged on the airframe so as to rotate in the plane substantially orthogonal to the plane in which the first propeller 121 rotates. Therefore, the rotation axes of the second propellers 131 are all directed to the front direction, and the four second propellers 131, 131, 131, 131 can rotate in the same plane.

The connecting tool 140 is for detachably connecting the airframe 11 and the four electric rotating brushes 150, 150, 150, 150 to each other. As the connecting tool 140, a rod shaped one made of a material having rigidity such as metal, carbon, high-hardness plastic and the like can be used, for example. One of end portions of this connecting tool 140 is fixed to the airframe 11 by a screw or the like, while to the other end portion, the four electric rotating brushes 150, 150, 150, 150 are attached. Each of the electric rotating brushes 150 has a rotatable brush portion 151 and a brush motor 152 for rotating/driving the brush portion 151. Here, as the electric rotating brush 150, those sold in the market can be used. Rotation start, rotation stop, and a rotation speed of each of the brush motors 152 are controlled by the flight control means upon receipt of a signal from the remote control device as illustrated in FIG. 2, for example. Moreover, in this variation, each of the electric rotating brushes 150 is arranged so as to be located on the front of the airframe 11 and each of the rotary blade portions. Furthermore, each of the electric rotating brushes 15 is arranged so that the rotation axis of the electric rotating brush 150 (brush portion 151) and the rotation axis of the second propeller 131 are substantially in parallel with each other. Moreover, the receiver is for receiving a signal related to a flight transmitted from the remote control device. Moreover, this receiver also receives a signal that the rotation of the electric rotating brush should be started, a signal that the rotation should be stopped, and a signal related to the rotation speed thereof transmitted from the remote control device in addition to the signals related to the flight.

As the connecting tool 140, the one including a mechanism (angle adjustment portion) which can adjust the angle of each of the electric rotating brushes 150 to the airframe 11 automatically or manually may be used. For example, it may be so configured that a motor for adjusting the angle of each of the electric rotating brushes 150 to the airframe 11 is provided in the connecting tool 140, and the flight control means automatically adjusts the angle of each of the electric rotating brushes 150 to the airframe 11 by controlling the driving of the motor on the basis of the signal related to the angle of the electric rotating brush sent from the remote control device. Moreover, it may be so configured that a mechanism which can manually change the angle of each of the electric rotating brushes 150 to the airframe 110 in plural stages is provided in the connecting tool 140, and the operator changes each of the electric rotating brushes 150 to a desired angle before starting the operation of the aircraft 100. Furthermore, as the connecting tool 140, the one including a mechanism which can freely change the angle along the surface of the cleaning target may be used.

The flight control means is called a so-called flight controller and controls the flight of the aircraft 100 (airframe 11) by controlling mainly the driving of the first motor 122 of each of the first rotary blade portions 12 and the driving of the second motor 132 of each of the second rotary blade portions 13. Moreover, in this variation, the flight control means also controls the rotation/driving of each of the electric rotating brushes 150. More specifically, when each of the electric rotating brushes 150 is not rotated/driven, and the cleaning work of the cleaning target is not performed, the flight control means controls the flight of the aircraft 100 by controlling only the driving of the first motor 122 of each of the first rotary blade portions 12 without driving the second motor 132 of each of the second rotary blade portions 13. On the other hand, when each of the electric rotating brushes 150 is rotated/driven, and the cleaning work of the cleaning target is performed, the flight control means controls the flight of the aircraft 100 so that the airframe 11 moves or hovers in the vicinity of the cleaning target by controlling the driving of the first motor 122 of each of the first rotary blade portions 12 and controls the flight of the aircraft 100 so that the airframe 11 moves to a direction in which each of the electric rotating brushes 150 presses the surface of the cleaning target by controlling the driving of the second motor 132 of each of the second rotary blade portions 13. Here, the flight control means can determine whether the cleaning work has now been started or not on the basis of the signal that the rotation of the electric rotating brush should be started sent from the remote control device. The flight control by the flight control means is not limited to the aforementioned method but the flight control means may be so configured to control the flight of the airframe by controlling the driving of the first motor 122 of each of the first rotary blade portions 12 and the driving of the second motor 132 of each of the second rotary blade portions 13 regardless of rotation/driving of each of the electric rotating brushes 150. That is, the second rotary blade portion 13 is not used only for pressing each of the electric rotating brushes 150 onto the surface of the cleaning target but may be used for the flight of the airframe with the first rotary blade portion 12.

In the aircraft of this variation, when each of the electric rotating brushes is brought into contact with the surface of the cleaning target, the aircraft receives the force from the surface but can counteract the force from the surface by using the large propelling force generated by the second rotary blade portion and thus, the airframe can be maintained in a state where each of the electric rotating brushes is reliably pressed onto the surface of the cleaning target. Therefore, by using the aircraft of this variation, the cleaning target can be efficiently cleaned.

In the aforementioned variation, the case in which the aircraft has four units of the first rotary blade portions and four units of the second rotary blade portions is described, but one, two, three or five or more first rotary blade portions may be provided in the aircraft. Moreover, one, two, three or five or more second rotary blade portions may be provided in the aircraft. Furthermore, in the aforementioned variation, the case in which the aircraft has four units of the electric rotating brushes is described, but one, two, three or five or more units of the electric rotating brushes may be provided in the aircraft.

Moreover, in the aforementioned variation, the case in which each of the electric rotating brushes is arranged so that the rotation axis (center axis) of each of the electric rotating brushes and the rotation axis of the second propeller are substantially in parallel with each other is described, but each of the electric rotating brushes may be arranged so that an angle formed by the rotation axis (center axis) of each of the electric rotating brushes and the rotation axis of the second propeller is an angle within the range from 0 to 45 degrees. As a result, each of the second rotary blade portions can effectively generate the propelling force against the force received from the surface of the cleaning target.

Moreover, in the aircraft of the aforementioned variation, the case in which each of the second propellers is arranged on the airframe so as to rotate in the plane substantially orthogonal to the plane (rotation plane) in which the first propeller rotates is described, but the plane (rotation plane) in which the second propeller rotates does not necessarily have to be orthogonal to the rotation plane of the first propeller. For example, when each of the electric rotating brushes is arranged on the front of the airframe and the direction of the rotation axis of each of the electric rotating brushes is substantially in parallel with the front-back direction of the airframe, it is only necessary that each of the second propellers is arranged on the airframe so as to rotate in such a plane that the angle formed with the rotation plane of the first propeller is an angle within the range from 45 to 90 degrees. As a result, the second rotary blade portion can effectively generate the propelling force against the force received from the surface of the cleaning target when each of the electric rotating brushes is brought into contact with the cleaning target. Moreover, each of the second propellers may be arranged on the airframe so as to rotate in such a plane that the angle formed with the rotation plane of the first propeller is an angle within the range from 0 to 45 degrees.

Moreover, in the aforementioned variation, it can be so configured that each of the electric rotating brushes is provided on the lower side of the airframe so that the rotation axis of each of the electric rotating brushes is substantially in parallel with the center axis of the airframe and each of the second propellers is arranged on the airframe so as to rotate in the plane substantially in parallel with the plane in which the first propeller rotates. In this case, the flight control means controls the flight of the aircraft so that the airframe moves or hovers in the vicinity of the cleaning target by controlling the driving of the first motor of each of the first rotary blade portions during the cleaning work of the cleaning target and controls the flight of the aircraft so that each of the electric rotating brushes presses the surface of the cleaning target and the airframe moves downward by controlling the driving of the second motor of each of the second rotary blade portions. As a result, the cleaning work can be performed by pressing each of the electric rotating brushes onto the cleaning target with a predetermined pressure, while the airframe flies stably.

Furthermore, in the aforementioned variation, it is only necessary that the second propeller of each of the second rotary blade portions is arranged on the airframe in general so that the propelling force against the force received from the surface of the cleaning target can be obtained when each of the electric rotating brushes is brought into contact with the cleaning target. As a result, the second rotary blade portion can be reliably used for obtaining the propelling force against the force received from the surface of the cleaning target when each of the electric rotating brushes is brought into contact with the cleaning target.

As is known from above, the present invention can be applied to an aircraft including a mounting equipment applying a reaction force to the airframe in use in general, not limited to the nozzle, the brush or the like. That is, the present invention can be applied to an aircraft including an airframe, one or a plurality of first rotary blade portions having a first rotary blade arranged on the airframe for flying the airframe and first driving means for rotating/driving the first rotary blade, a mounting equipment mounted on the airframe and applying a reaction force to the airframe during use, one or a plurality of second rotary blade portions having a second rotary blade arranged on the airframe so as to obtain a propelling force against the reaction force generated by using the mounting equipment and second driving means for rotating/driving the second rotary blade, and flight control means for controlling the flight of the airframe by controlling driving of each of the first driving means and each of the second driving means. As described above, since the second rotary blade portion can be used for obtaining the propelling force against the reaction force generated by using the mounting equipment by providing one or a plurality of the second rotary blade portions in which the second rotary blade is arranged on the airframe in the aircraft of the present invention so as to obtain the propelling force against the reaction force generated by using the mounting equipment in addition to one or a plurality of the first rotary blade portions, the aircraft of the present invention can make a stable flight even in use of the mounting equipment. The aforementioned various variations can be applied also to this aircraft.

Figure 18:
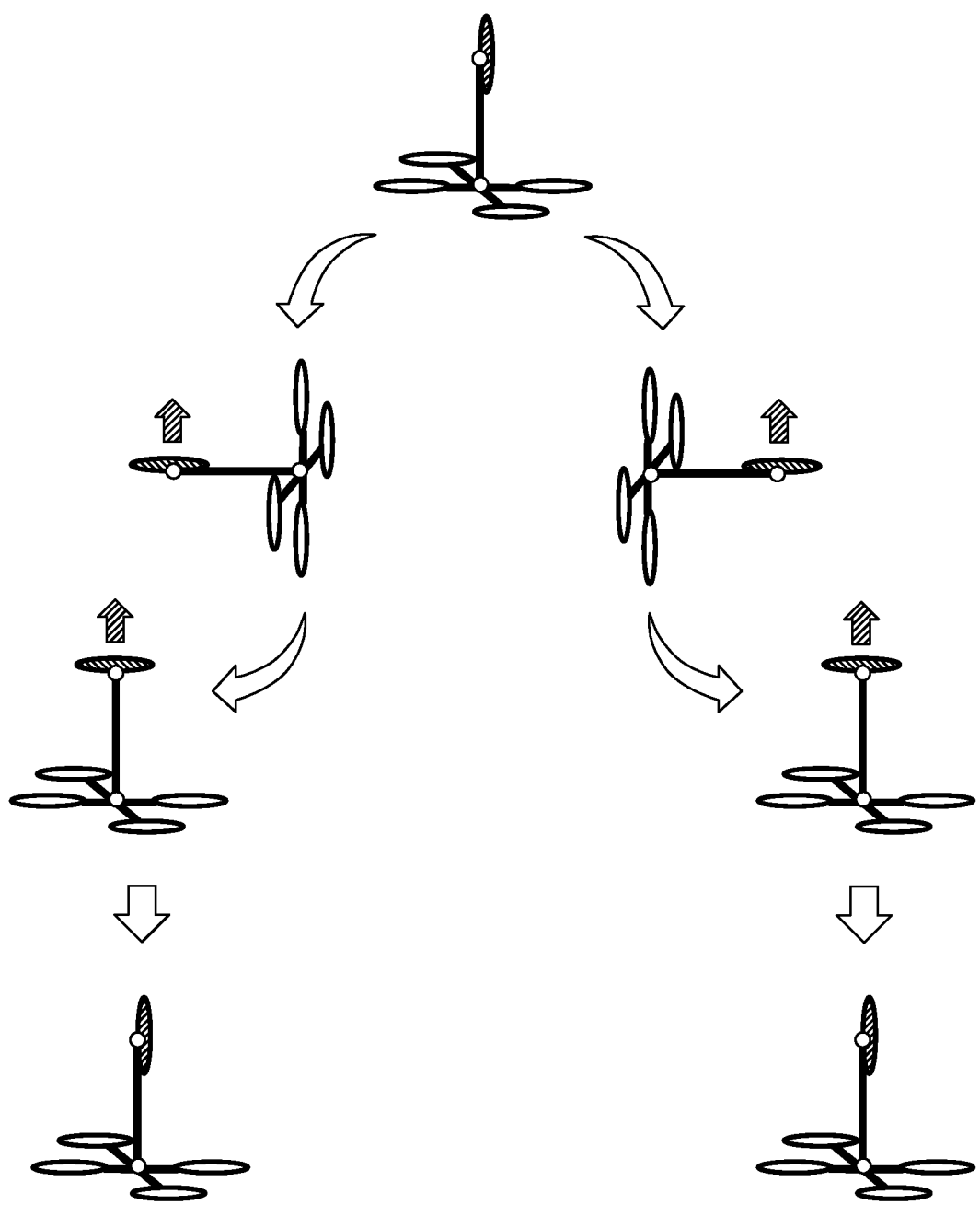
FIG. 18 is a schematic diagram illustrating a flow of returning the airframe to a state of a normal flight when an attitude of the airframe is lost in the aircraft having four units of the first rotary blade portions, one unit of the second rotary blade portion, and an angle adjustment mechanism.
Figure 19:
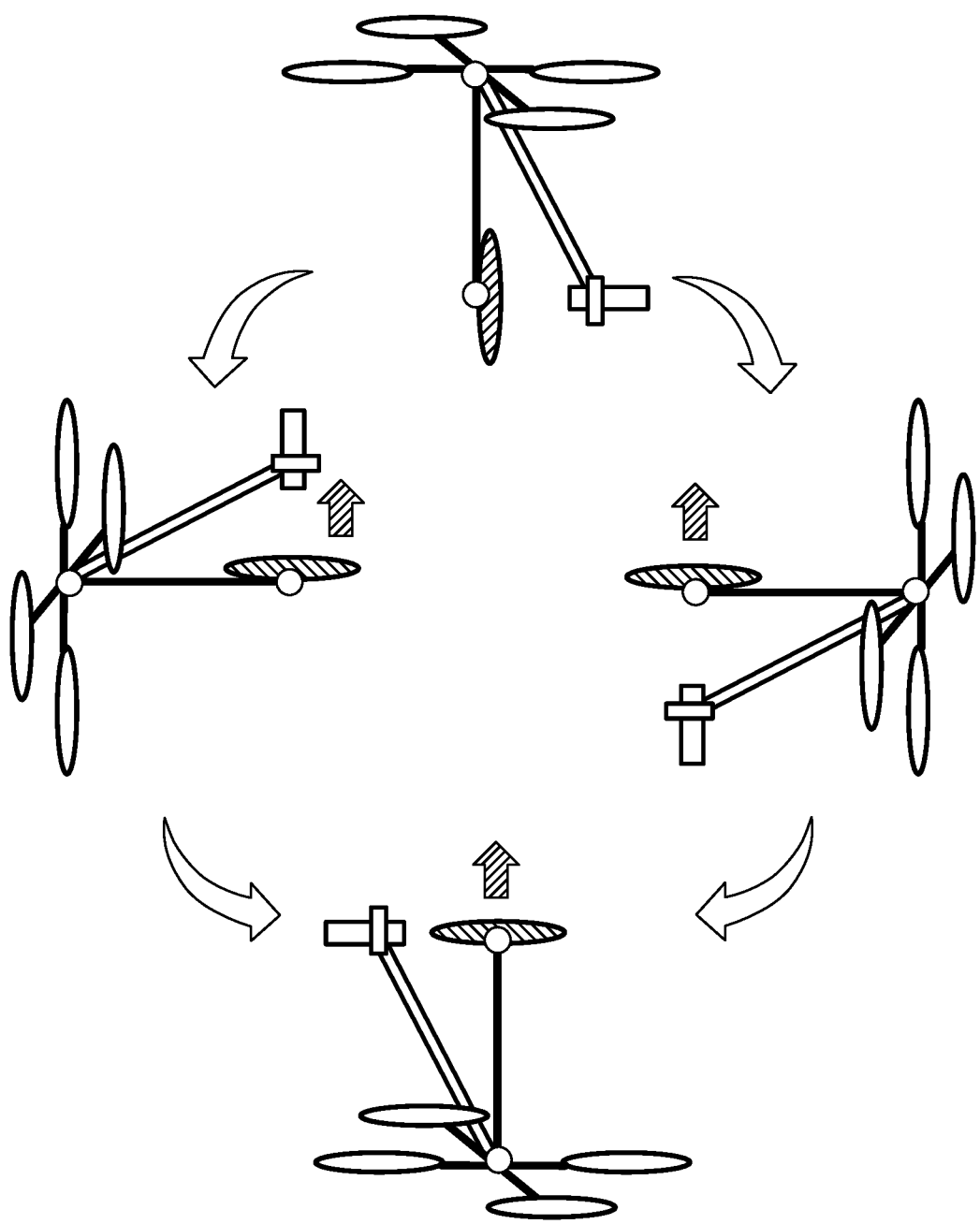
FIG. 19 is a schematic diagram illustrating a flow of emergency landing of the airframe by reducing a falling speed of the airframe when an attitude of the airframe is lost in the aircraft having four units of the first rotary blade portions, one unit of the second rotary blade portion, an angle adjustment mechanism, and a mounting equipment.
Figure 20:
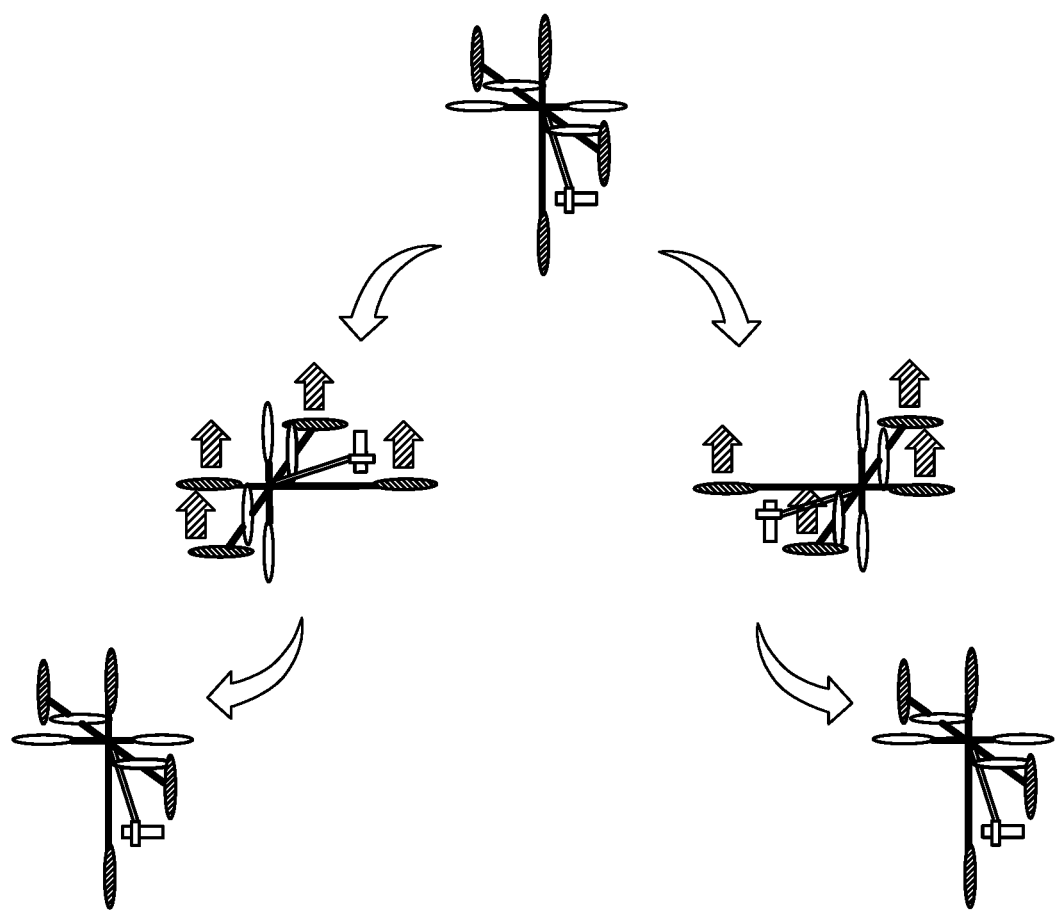
FIG. 20 is a schematic diagram illustrating a flow of returning the airframe to a state of a normal flight when an attitude of the airframe is lost in the aircraft having four units of the first rotary blade portions, four units of the second rotary blade portions, and the mounting equipment.

Moreover, by using the second rotary blade portion of the present invention, the aircraft capable of maintaining a stable flight of the airframe can be realized. In this case, the aircraft according to the present invention includes an airframe, one or a plurality of first rotary blade portions having a first rotary blade arranged on the airframe for flying the airframe and first driving means for rotating/driving the first rotary blade, one or a plurality of second rotary blade portions having a second rotary blade arranged on the airframe for obtaining a force against an external force which makes an attitude of the airframe unstable and second driving means for rotating/driving the second rotary blade, an angle adjustment mechanism for adjusting a rotation axis direction of each of the second rotary blades, and flight control means for controlling a flight of the airframe by controlling driving of each of first driving means during the flight, and for realizing a stable flight by controlling the angle adjustment mechanism when an attitude of the airframe is changed upon receipt of the external force during the flight so as to adjust the rotation axis direction of each of the second rotary blades, and by controlling the driving of each of the second driving means so as to reduce an influence of the external force on the airframe. In this aircraft, since the flight control means controls the angle adjustment mechanism when the attitude of the airframe is changed upon receipt of the external force during the flight so as to adjust the rotation axis direction of each of the second rotary blades and controls the driving of each of the second driving means so as to reduce the influence of the external force on the airframe, so, even if the airframe largely loses the attitude due to the disturbance, the flight can be continued, a fall can be prevented, a falling speed can be reduced, or a flight is temporarily maintained and can be recovered to a normal flight by the first rotary blade by suppressing the attitude change of the airframe. More specifically, the flight control means can handle any attitude change of the airframe by changing the direction of a thrust of the second rotary blade by the angle adjustment mechanism or by changing the direction of the thrust of the second rotary blade by rotating the second rotary blade reversely. FIG. 18 is a schematic diagram illustrating a flow of returning the airframe to a state of a normal flight if the attitude of the airframe is lost in the aircraft having four units of the first rotary blade portions, one unit of the second rotary blade portion, and the angle adjustment mechanism. In FIG. 18, the diagram on the uppermost side illustrates the aircraft flying normally, and the diagram on the upper center side illustrates the aircraft which lost the attitude of the airframe. When the attitude of the aircraft is lost as above, the flight control means drives the angle adjustment mechanism and the second driving means so as to cause the thrust of the second rotary blade to be generated and to change the direction of the thrust, whereby the attitude of the airframe can be returned as illustrated in the diagram on the lower center side. Then, as illustrated in the diagram on the lowermost side, the aircraft can be returned to the normal flight state. FIG. 19 is a schematic diagram illustrating a flow of emergency landing of the airframe by reducing the falling speed of the airframe when the attitude of the airframe is lost in the aircraft having four units of the first rotary blade portions, one unit of the second rotary blade portion, the angle adjustment mechanism, and the mounting equipment such as a nozzle and the like. In this FIG. 19, the diagram on the upper side illustrates the aircraft flying normally, and the diagram at the center illustrates the aircraft which lost the attitude of the airframe. When the attitude of the aircraft is lost as above, the flight control means drives the angle adjustment mechanism and the second driving means so as to cause the thrust of the second rotary blade in the upper direction to be generated, for example, and thus, can cause the aircraft to make emergency landing by reducing the falling speed of the airframe as illustrated in the diagram on the lower side. FIG. 20 is a schematic diagram illustrating a flow of returning the airframe to the state of the normal flight when the attitude of the airframe is lost in the aircraft having four units of the first rotary blade portions, four units of the second rotary blade portions, and the mounting equipment such as the nozzle and the like. In this FIG. 20, the diagram on the upper side illustrates the aircraft flying normally, and the diagram at the center illustrates the aircraft which lost the attitude of the airframe. When the attitude of the aircraft is lost as above, the flight control means can return the attitude of the airframe to the original state as illustrated on the diagram on the lower side by causing the thrust of each of the second rotary blades to be generated by driving each of the second driving means.

INDUSTRIAL APPLICABILITY

As described above, in the aircraft according to the first invention, since one or a plurality of the second rotary blade portions in which the second rotary blade is arranged on the airframe so as to obtain the propelling force against the reaction force caused by the liquid discharge is provided in addition to one or a plurality of the first rotary blade portions, the second rotary blade portion can be used for obtaining the propelling force against the reaction force when the liquid is discharged to the outside from the nozzle and thus, the aircraft according to the first invention can make a stable flight even at the liquid discharge from the nozzle. Moreover, in the aircraft system according to the second invention, by providing the master aircraft which is the aforementioned aircraft and at least one slave aircraft for following the master aircraft and for suspending the hose, the master aircraft and each of the slave aircrafts can make a stable flight even at the liquid discharge from the nozzle and can suspend the hose by a plurality of aircrafts and easily transport it to a high position or a far site even if a long hose is used. Therefore, the aircraft according to the first invention and the aircraft system according to the second invention are suitable for use for a liquid discharge work to a range where a person cannot reach or more specifically, a firefighting activity, a cleaning work of a large-sized building or an aircraft, a pesticide spraying work in a large farmland and the like.

Moreover, in the aircraft according to the third invention, by providing one or a plurality of the second rotary blade portions in which the second rotary blade is arranged on the airframe so as to obtain the propelling force against the force received from the surface of the cleaning target when each of the electric rotating brushes is brought into contact with the surface of the cleaning target in addition to one or a plurality of the first rotary blade portions, the airframe can be maintained in the state where each of the electric rotating brushes can be reliably pressed onto the surface of the cleaning target by using the propelling force generated by the second rotary blade portion and thus, cleaning of the cleaning target can be efficiently performed by using the aircraft according to the third invention. Therefore, the aircraft according to the third invention is suitable for use for the cleaning work for a large-sized building, an aircraft and the like without discharging a liquid such as water or for cleaning in collaboration with the conventional water discharge work using a water-discharge hose for household and the like.

Moreover, in the aircraft according to the fourth invention, by providing one or a plurality of the second rotary blade portions in which the second rotary blade is arranged on the airframe so as to obtain the propelling force against the reaction force generated by using the mounting equipment in addition to one or a plurality of the first rotary blade portions, the second rotary blade portion can be used for obtaining the propelling force against the reaction force generated by using the mounting equipment and thus, the aircraft of the fourth invention can make a stable flight even in use of the mounting equipment. Therefore, various types of equipment generating the reaction force other than the firefighting hose and the cleaning nozzle can be mounted on the aircraft according to the fourth invention.

Furthermore, in the aircraft according to the fifth invention, when the attitude of the airframe is changed upon receipt of the external force during the flight, the flight control means reduces the influence of the external force on the airframe by controlling the angle adjustment mechanism so as to adjust the rotation axis direction of each of the second rotary blades and by controlling the driving of each of the second driving means so that the attitude change of the airframe is suppressed, and a stable flight of the airframe can be maintained even if the airframe largely loses the attitude by disturbance. Therefore, since flight stability can be improved, crash accidents of the aircraft can be reduced.

DESCRIPTION OF THE REFERENCE NUMERAL

10, 100 master aircraft (aircraft)
11 airframe
111 fuselage portion
112a to 112f arm portion
12 first rotary blade portion
121 first propeller (first rotary blade)
122 first motor (first driving means)
13 second rotary blade portion
131 second propeller (second rotary blade)
132 second motor (second driving means)
14, 140 connecting tool
15 nozzle
150 electric rotating brush
151 brush portion
152 brush motor
16a gyro sensor
16b altitude sensor
16c GPS sensor
17 receiver
18 transmitter
19 flight control means
20 slave aircraft
21 airframe
211 fuselage portion
212a to 212d arm portion
22 rotary blade portion
221 propeller (rotary blade)
222 motor (driving means)
23 suspending means
24a gyro sensor
24b altitude sensor
24c GPS sensor
25 receiver
26 transmitter
27 flight control means
28 connecting member
30 remote control device
31 front-rear-right-left lever
32 up-down lever
33 water-discharge start switch
34 water-discharge stop switch
35 water-discharge amount lever
36 state maintaining start switch
37 state maintaining cancellation switch
50 hose
60 water-discharge pumper vehicle

The invention claimed is:
1. An aircraft, comprising:
an airframe;
a plurality of first rotary blade portions having a first rotary blade arranged on the airframe so as to rotate in a plane substantially perpendicular to a center axis of the airframe and first driving means for rotating/driving the first rotary blade;

a nozzle fixed to the airframe and to which a hose for sending out a liquid is attached;

one or a plurality of second rotary blade portions having a second rotary blade arranged on the airframe so as to obtain a propelling force against a reaction force when the liquid is discharged to an outside from the nozzle through the hose and second driving means for rotating/driving the second rotary blade; and flight control means for controlling a flight of the airframe by controlling driving of each of the first driving means and each of the second driving means, wherein the second rotary blade portion is directly connected to the airframe of the aircraft of is indirectly connected to the airframe by way of being integrated with the nozzle, and is arranged vertically below the airframe;

the nozzle is connected to the airframe of the aircraft and arranged vertically below the airframe of the aircraft so that a center axis of the nozzle and a rotation axis of the second rotary blade are positioned on the same straight line or a straight line connecting a center of the nozzle and a center of the second rotary blade is substantially in a parallel with a longitudinal direction of the airframe; and the flight control means controls the driving of the second driving means so that the airframe is not rotated by a moment of force by the reaction force at the liquid discharge from the nozzle and the propelling force by the second rotary blade.

2. The aircraft according to claim 1, wherein the nozzle is detachably fixed to the airframe through a connection tool made of a material having rigidity or is detachably provided directly to the airframe.

3. The aircraft according to claim 1, wherein the aircraft is an unmanned aircraft.

* * * * *